United States Patent
Fukase

(10) Patent No.: US 10,402,961 B2
(45) Date of Patent: Sep. 3, 2019

(54) INSPECTION APPARATUS, INSPECTION SYSTEM, INSPECTION METHOD, AND RECORDING MEDIUM

(71) Applicant: Takahiro Fukase, Kanagawa (JP)

(72) Inventor: Takahiro Fukase, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 55 days.

(21) Appl. No.: 15/586,453

(22) Filed: May 4, 2017

(65) Prior Publication Data

US 2018/0108122 A1 Apr. 19, 2018

(30) Foreign Application Priority Data

Oct. 17, 2016 (JP) .................................. 2016-203478

(51) Int. Cl.
*G06T 7/00* (2017.01)
*G06T 7/11* (2017.01)
*G06T 7/12* (2017.01)

(52) U.S. Cl.
CPC ............ *G06T 7/001* (2013.01); *G06T 7/0008* (2013.01); *G06T 7/11* (2017.01); *G06T 7/12* (2017.01); *G06T 2207/10024* (2013.01); *G06T 2207/20021* (2013.01); *G06T 2207/20224* (2013.01); *G06T 2207/30144* (2013.01)

(58) Field of Classification Search
None
See application file for complete search history.

(56) References Cited

U.S. PATENT DOCUMENTS

| | | | | |
|---|---|---|---|---|
| 5,999,636 A | * | 12/1999 | Juang | B41F 33/02 250/559.05 |
| 2009/0220264 A1 | * | 9/2009 | Kobayashi | G03G 15/0131 399/49 |
| 2014/0093139 A1 | * | 4/2014 | Yamagishi | H04N 1/00034 382/112 |
| 2015/0063700 A1 | * | 3/2015 | Soundararajan | G06K 9/18 382/182 |

(Continued)

FOREIGN PATENT DOCUMENTS

| | | |
|---|---|---|
| JP | 2004-094438 | 3/2004 |
| JP | 2007-093304 | 4/2007 |

(Continued)

*Primary Examiner* — Vikkram Bali
(74) *Attorney, Agent, or Firm* — Oblon, McClelland, Maier & Neustadt, L.L.P.

(57) ABSTRACT

An inspection apparatus, system, and method, each of which: acquires a master image serving as an inspection reference, the master image being generated based on image data to be printed as a printed image; acquires a read image read from the printed image; extracts a neighboring region neighboring an edge region of the master image; determines whether a change amount of density of pixels in the neighboring region falls within a predetermined range; based on a determination that the change amount of density of pixels in the neighboring region falls within the predetermined range, calculates a statistic of density of pixels in a corresponding region of the read image, which corresponds to the neighboring region of the master image; and determines existence or non-existence of a defect in the corresponding region of the read image based on the statistic of the corresponding region.

18 Claims, 17 Drawing Sheets

(56) References Cited

U.S. PATENT DOCUMENTS

| | | | |
|---|---|---|---|
| 2015/0063889 A1* | 3/2015 | Kojima | G03G 15/36 399/394 |
| 2015/0078627 A1* | 3/2015 | Fukase | G06T 7/001 382/112 |
| 2015/0243010 A1 | 8/2015 | Kaneko | |

FOREIGN PATENT DOCUMENTS

| | | |
|---|---|---|
| JP | 2014-155113 | 8/2014 |
| JP | 2015-179073 | 10/2015 |

* cited by examiner

INSPECTION APPARATUS, INSPECTION SYSTEM, INSPECTION METHOD, AND RECORDING MEDIUM

CROSS-REFERENCE TO RELATED APPLICATIONS

This patent application is based on and claims priority pursuant to 35 U.S.C. § 119(a) to Japanese Patent Application No. 2016-203478, filed on Oct. 17, 2016, in the Japan Patent Office, the entire disclosure of which is hereby incorporated by reference herein.

BACKGROUND

Technical Field

The present invention relates to an inspection apparatus, an inspection system, an inspection method, and a recording medium.

Description of the Related Art

Conventionally, inspection of printed matters has been performed by manpower. However, in recent years, apparatuses that perform inspection are used in post-processing of offset printing. Such an inspection apparatus generates a master image, which is confirmed not to have a defect, compares the master image and a corresponding portion of a read image of a printed matter to be inspected, and determines a defect of the printed matter according to the degree of a difference between the master image and the corresponding portion.

However, the read image is influenced by physical characteristics of when the read image is printed or read, and thus complete match of the density of the read image and the density of the master image is difficult. Therefore, in the above-described inspection by comparison between the master image and the read image, inspection is performed, allowing a difference between the density of the read image and the density of the master image to a certain degree.

SUMMARY

Example embodiments of the present invention include an inspection apparatus, system, and method, each of which: acquires a master image serving as an inspection reference, the master image being generated based on image data to be printed as a printed image; acquires a read image read from the printed image; extracts a neighboring region neighboring an edge region of the master image; determines whether a change amount of density of pixels in the neighboring region falls within a predetermined range; based on a determination that the change amount of density of pixels in the neighboring region falls within the predetermined range, calculates a statistic of density of pixels in a corresponding region of the read image, which corresponds to the neighboring region of the master image; and determines existence or non-existence of a defect in the corresponding region of the read image based on the statistic of the corresponding region.

Example embodiments of the present invention include a non-transitory recording medium storing a control program for performing the inspection method.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
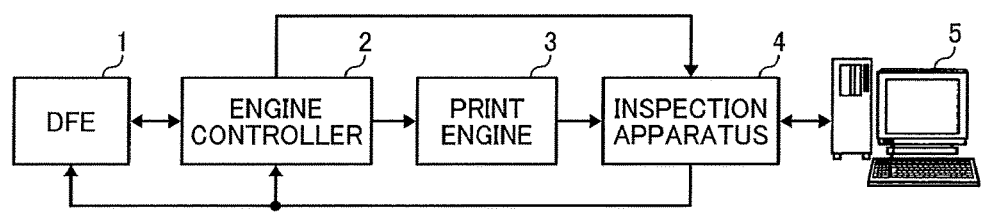
FIG. 1 is a diagram illustrating an example of a configuration of an image inspection system including an inspection apparatus according to a first embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

First Embodiment

Hereinafter, an embodiment of the present invention will be described in detail referring to the drawings. In the first embodiment, an image inspection system including an inspection apparatus that compares a read image, which is a read output result of an image formation output, and a master image, to inspect the output result will be described as an example. In such a system, the first embodiment is characterized to favorably perform defect determination in a region adjacent to an edge of the master image if there is a margin area or a solid area in the region. FIG. 1 is a diagram illustrating an example of general arrangement of the image inspection system according to the first embodiment.

As illustrated in FIG. 1, the image inspection system according to the first embodiment includes a digital front end (DFE) 1, an engine controller 2, a print engine 3, an inspection apparatus 4, and an interface terminal 5. The DFE 1 is an image processing apparatus that generates bitmap data that is original image data to be printed, that is, an output target image, based on a received print job, and outputs the generated bitmap data to the engine controller 2.

The engine controller 2 controls the print engine 3 based on the bitmap data received from the DFE 1 to execute the image formation output. Further, the engine controller 2 transmits the bitmap data received from the DFE 1 to the inspection apparatus 4 as information for generating a master image that serves as a reference when the inspection apparatus 4 inspects a result of the image formation output by the print engine 3.

The print engine 3 is an image forming apparatus that executes the image formation output for a sheet as a recording medium based on the bitmap data according to the control of the engine controller 2. As the recording medium, a film or a plastic sheet-like material that can be a target for the image forming output is employable other than the above-described sheet.

The inspection apparatus 4 generates the master image based on the bitmap data input from the engine controller 2. The inspection apparatus 4 then compares a read image, which is generated by reading a sheet surface of the sheet output by the print engine 3, that is, a surface of the recording medium, with a reading device, and the generated master image, to inspect the output result.

When the inspection apparatus 4 determines that there is a defect in the output result, the inspection apparatus 4 notifies the engine controller 2 of information that indicates a page determined to have the defect. With the notification, the engine controller 2 executes re-printing control of the defective page.

Further, the inspection apparatus 4 according to the first embodiment has a function to analyze the master image to extract the margin area and the solid area in an edge region and the neighborhood of the edge region in the master image, and to inspect a read image in that regions separately from comparison with the master image. Such a function is one of points in the first embodiment.

The interface terminal 5 is an information processing terminal for displaying a graphical user interface (GUI) for confirming a defect determination result by the inspection apparatus 4 or a GUI for setting parameters in the inspection, and is realized by a typical information processing terminal such as a personal computer (PC).

Figure 2:
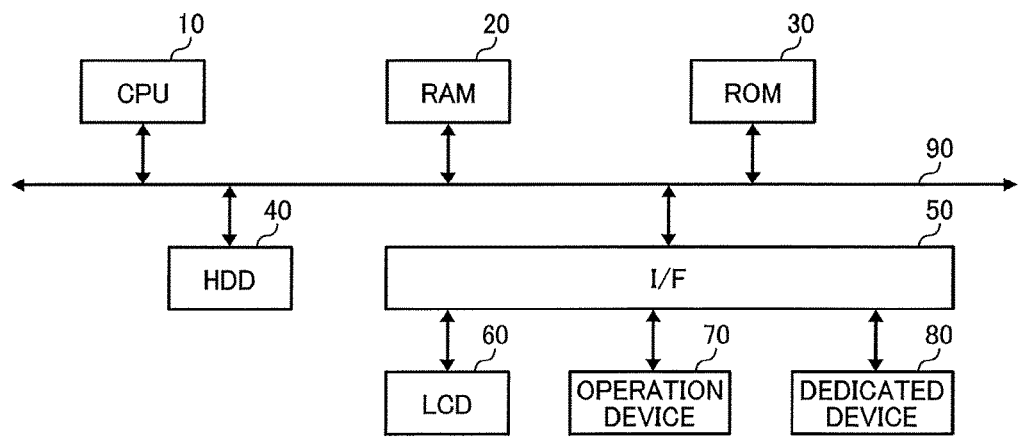
FIG. 2 is a block diagram illustrating an example of a hardware configuration of the inspection apparatus according to the first embodiment.

Hardware that configures the DFE 1, the engine controller 2, the print engine 3, the inspection apparatus 4, and the interface terminal 5 according to the first embodiment will be described referring to FIG. 2. FIG. 2 is a block diagram illustrating an example of a hardware configuration of the inspection apparatus 4 according to the first embodiment. While FIG. 2 illustrates a hardware configuration of the inspection apparatus 4, other apparatuses have similar configurations.

As illustrated in FIG. 2, the inspection apparatus 4 according to the first embodiment has a configuration similar to an information processing apparatus such as a typical personal computer (PC) or server. That is, the inspection apparatus 4 according to the first embodiment has a central processing unit (CPU) 10, random access memory (RAM) 20, read only memory (ROM) 30, a hard disk drive (HDD) 40, and an interface (I/F) 50 connected through a bus 90. Further, the I/F 50 is connected with a liquid crystal display (LCD) 60, an operation device 70, and a dedicated device 80.

The CPU 10 is an arithmetic logic unit, and controls an operation of the entire inspection apparatus 4. The RAM 20 is a volatile storage medium capable of reading information at a high speed, and is used as a work area when the CPU 10 processes the information. The ROM 30 is a non-volatile storage medium for read only, and in which a program such as firmware is stored. The HDD 40 is a non-volatile storage medium capable of reading the information, and in which an operating system (OS), various control programs, an application program, and the like are stored.

The I/F 50 connects and controls the bus 90, and various types of hardware, a network, and the like. The LCD 60 is a perceptual user interface for a user to confirm a state of the inspection apparatus 4. The operation device 70 is a user interface, such as a keyboard and a mouse, for the user to input information to the inspection apparatus 4.

The dedicated device 80 is hardware for realizing special functions in the engine controller 2, the print engine 3, and the inspection apparatus 4. The dedicated device 80 is a conveyance mechanism that conveys the sheet as an image formation output target and a plotter apparatus that executes the image formation output on the sheet surface in the case of the print engine 3. The dedicated device 80 is a special arithmetic logic unit for performing image processing at a high speed in the cases of the engine controller 2 and the inspection apparatus 4. Such an arithmetic logic unit is formed as an application specific integrated circuit (ASIC), for example. Further, the reading device that reads an image output on the sheet surface is also realized by the dedicated device 80.

In such a hardware configuration, when the CPU 10 performs an arithmetic operation according to the program stored in the ROM 30 or the program read to the RAM 20 from the HDD 40 or a recording medium such as an optical disk, a software controller is formed. A combination of the software controller formed as described above and the hardware configures functional blocks that realize functions of the DFE 1, the engine controller 2, the print engine 3, the inspection apparatus 4, and the interface terminal 5 according to the first embodiment.

Figure 3:
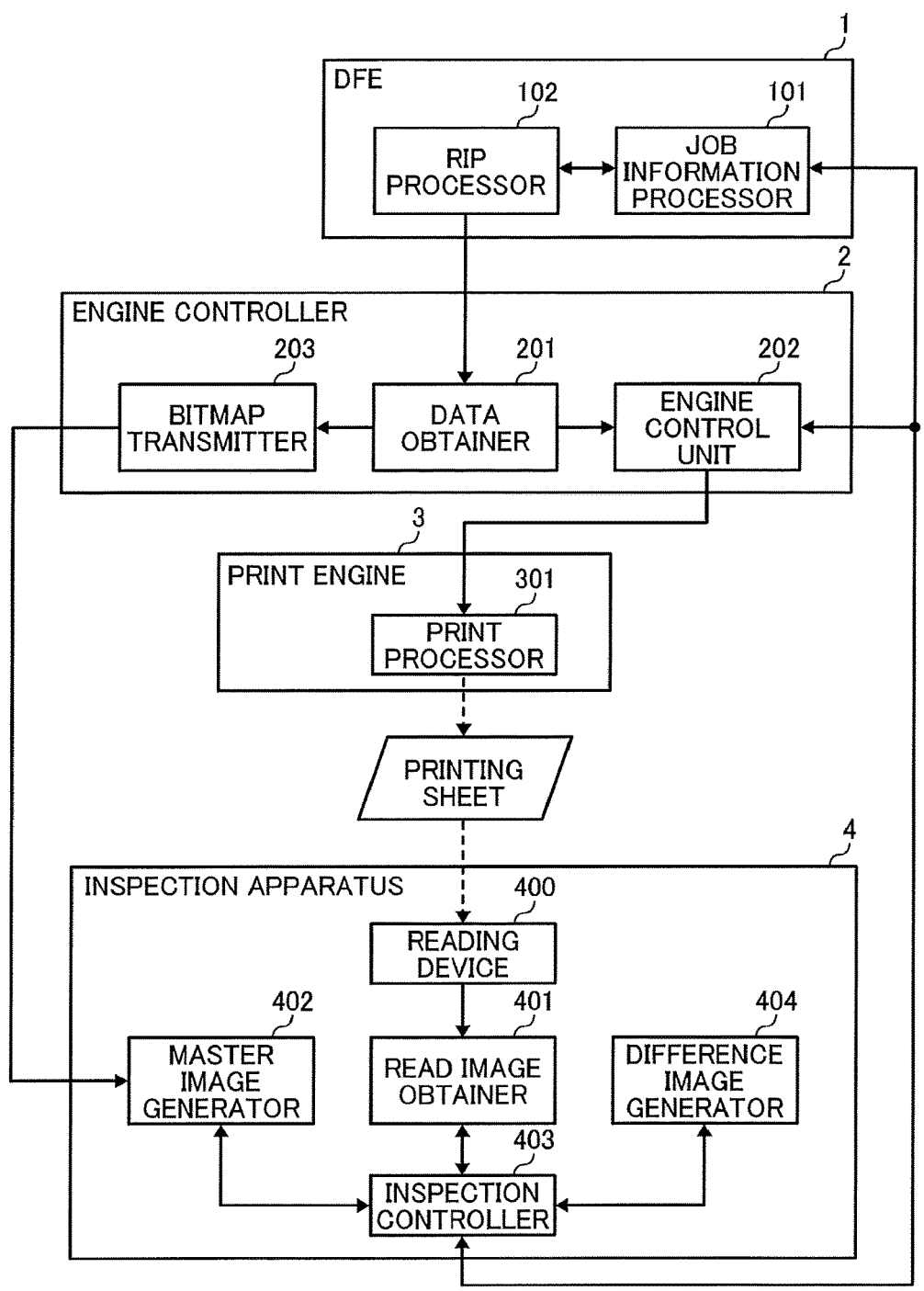
FIG. 3 is a block diagram illustrating an example of functional configurations of a digital front end (DFE), an engine controller, a print engine, and the inspection apparatus according to the first embodiment.

FIG. 3 is a block diagram illustrating an example of functional configurations of the DFE 1, the engine controller 2, the print engine 3, and the inspection apparatus 4 according to the first embodiment. FIG. 3 illustrates transmission/reception of data by the solid lines and a flow of the sheet by the broken lines. As illustrated in FIG. 3, the DFE 1 according to the first embodiment includes a job information processor 101 and a raster image processing (RIP) processor 102. The engine controller 2 includes a data obtainer 201, an engine control unit 202, and a bitmap transmitter 203. The print engine 3 includes a print processor 301. The inspection apparatus 4 includes a reading device 400, a read image obtainer 401, a master image generator 402, an inspection controller 403, and a difference image generator 404.

The job information processor 101 controls execution of the image formation output on the basis of a print job input from an outside of the DFE 1 through the network or a print job generated on the basis of image data stored in the DFE 1 by an operation of an operator. In the execution of the image formation output, the job information processor 101 causes the RIP processor 102 to generate the bitmap data on the basis of the image data included in the print job.

The RIP processor 102 generates the bitmap data for allowing the print engine 3 to execute the image formation output based on the image data included in the print job according to the control of the job information processor 101. The bitmap data is information of pixels that configure an image to be formed and output.

The print engine 3 according to the first embodiment executes the image formation output based on a binary image in cyan, magenta, yellow, key plate (CMYK) colors. In contrast, typically, data of an image included in the print job is a multi-value image in which one pixel is expressed with multiple gradations such as 256 gradations. Therefore, the RIP processor 102 converts the image data included in the print job from the multi-value image into a small-value image to generate binary bitmap data in CMYK colors, and transmits the bitmap data to the engine controller 2.

The data obtainer 201 acquires the bitmap data input from the DFE 1, and operates the engine control unit 202 and the bitmap transmitter 203. The engine control unit 202 causes the print engine 3 to execute the image formation output based on the bitmap data transferred from the data obtainer 201. The bitmap transmitter 203 transmits the bitmap data acquired by the data obtainer 201 to the inspection apparatus 4 for generation of a master image.

The print processor 301 is an image forming unit that acquires the bitmap data input from the engine controller 2, executes the image formation output for the printing sheet, and outputs a printed matter. The print processor 301 according to the first embodiment is realized by a typical image forming mechanism of an electrophotography system. However, another image forming mechanism such as an inkjet system can also be used.

The reading device 400 is an image reader that reads the printed matter printed and output by the print processor 301, and outputs the read image. The reading device 400 is a line scanner installed on a conveyance path inside the inspection apparatus 4, the conveying path being of the printing sheet output by the print processor 301, and scans the sheet surface of the conveyed printing sheet to read the image formed on the sheet surface.

The read image generated by the reading device 400 becomes a target for the inspection by the inspection apparatus 4. The read image is an image generated by reading the sheet surface of the sheet output by the image formation output, and is thus an image that indicates an output result. The read image obtainer 401 acquires the read image, which is generated by reading the sheet surface of the printing sheet by the reading device 400. The read image acquired by the read image obtainer 401 is input to the difference image generator 404 for comparison inspection. Note that the input of the read image to the difference image generator 404 is executed by control of the inspection controller 403. In so doing, the inspection controller 403 first acquires the read image, and then inputs the read image to the difference image generator 404.

The master image generator 402 acquires the bitmap data input from the engine controller 2, and generates the master image based on the bitmap data, as described above. Processing of generating the master image by the master image generator 402 will be described in detail below.

The inspection controller 403 is a controller that controls the operation of the entire inspection apparatus 4, and the configurations included in the inspection apparatus 4 are operated according to the control of the inspection controller 403. The difference image generator 404 generates a difference image that indicates a difference between the read image input from the read image obtainer 401 and the master image generated by the master image generator 402. The difference image generator 404 is configured from the above-described ASIC for rapidly processing a massive amount of calculation.

The difference image generator 404 compares a read image of 200 dots per inch (dpi) expressed with 8-bit red, green, and blue (RGB) colors and the master image for each corresponding pixels, and calculates difference values between 8-bit pixel values in RGB colors, for each pixels. The inspection controller 403 determines existence or non-existence of a defect in the read image based on a large-and-small relationship between the different values calculated in doing so and thresholds.

Figure 4:
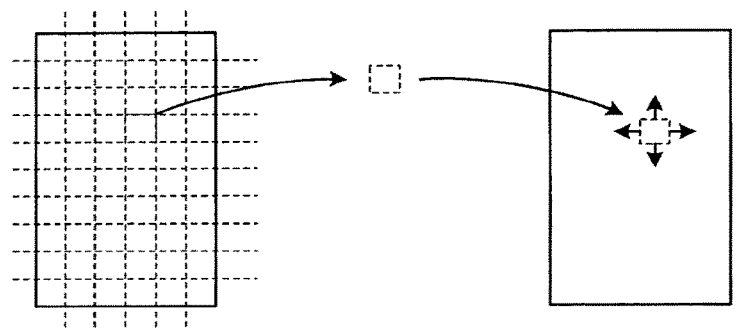
FIG. 4 is a diagram illustrating an example of a form of comparison inspection according to the first embodiment.

In the comparison between the read image and the master image, the difference image generator 404 superimposes the master image, which is divided in each predetermined range, with the read image corresponding to the divided range, and performs the difference calculation of the pixel values of the pixels, that is, the density of the pixels as illustrated in FIG. 4. Such processing is realized when the inspection controller 403 acquires the images in the range to be superimposed from the master image and the read image, respectively, and inputs the acquired images to the difference image generator 404.

Further, the inspection controller 403 determines a position where a total value of the calculated difference values is minimized, as an accurate superimposing position, while shifting the position of the divided range to be superimposed on the read image in lengthwise and crosswise directions, that is, shifting a range of an image to be acquired from the read image in lengthwise and crosswise directions, and employs the difference values of the pixels calculated at that time, as comparison results. Therefore, the difference image generator 404 can output shift amounts in lengthwise and crosswise directions of when the position is determined as a positioning position, together with the difference values of the pixels.

As illustrated in FIG. 4, each cell divided in a grid manner is the predetermined range in which the difference values of the pixels are summed up. The size of each divided range illustrated in FIG. 4 is determined on the basis of a range of which the difference image generator 404 configured from the ASIC, as described above, can compare the pixel values at a time, for example.

With such processing, after the read image and the master image are positioned, the difference value is calculated. The difference value calculated as described above is compared with a predetermined threshold, and the defect of the image is determined. Further, even if the read image as a whole and the master image as a whole have different scales, the images are divided in each range and positioning is performed, as illustrated in FIG. 4, and thus an influence due to scales can be decreased.

Further, as illustrated in FIG. 4, in each range divided as illustrated in FIG. 4, position shift amounts of adjacent ranges are expected to be relatively close. Therefore, in performing comparison inspection about each divided range, calculation is performed while shifting the range in the lengthwise and crosswise directions around the position shift amount determined in the comparison inspection of the adjacent region, so that a possibility of execution of calculation with accurate positioning is high even if the number of times to perform calculation while shifting the region in the lengthwise and crosswise directions is small. Therefore, the calculation amount as a whole can be decreased.

Further, the inspection controller 403 according to the first embodiment analyzes the master image to extract the margin area and the solid area in the edge region and the neighborhood of the edge region in the master image, as described above. Then, the inspection controller 403 performs inspection different from the comparison with the master image, for a region in the read image, the region corresponding to the extracted region. This function will be described in detail below.

Figure 5:
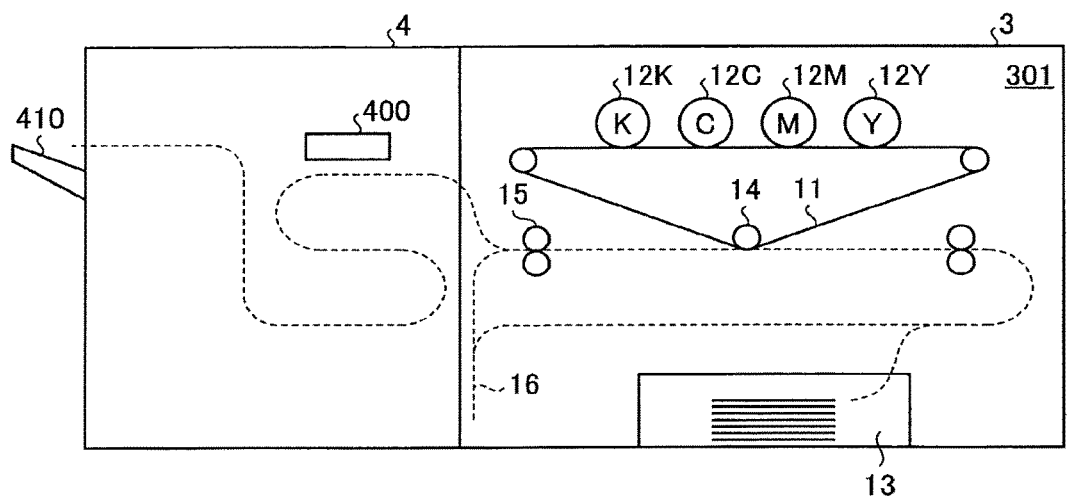
FIG. 5 is a diagram illustrating an example of mechanical configurations of the print engine and the inspection apparatus according to the first embodiment and a conveying path of a sheet.

Next, mechanical configurations of the print engine 3 and the inspection apparatus 4 and the conveyance path of the sheet will be described referring to FIG. 5. As illustrated in FIG. 5, the print processor 301 included in the print engine 3 according to the first embodiment has a configuration in which photoconductor drums 12Y, 12M, 12C, and 12K (hereinafter, collectively referred to as photoconductor drums 12) in colors are arranged along an endless conveyance belt 11, and is so-called tandem-type print processor.

That is, the photoconductor drums 12Y, 12M, 12C, and 12K are arrayed in order in a conveying direction of the conveyance belt 11 from an upstream side, along the conveyance belt 11 that is an intermediate transfer belt on which an intermediate transfer image to be transferred to the sheet (an example of a recording medium) fed from a sheet feeding tray 13 is formed.

When images in colors developed with toners on surfaces of the photoconductor drums 12 in colors are superimposed and transferred to the conveyance belt 11, a full-color image is formed. The full-color image formed on the conveyance belt 11 in this way is transferred onto the sheet surface of the sheet conveyed on the path, by a function of a transfer roller 14, at a position where the conveyance belt 11 comes closest to the conveyance path of the sheet illustrated by the broken lines in FIG. 5.

The sheet with the image formed on the sheet surface is further conveyed and the image is fixed by fixing rollers 15, and then the sheet is conveyed to the inspection apparatus 4. In a case of duplex printing, the sheet with the image formed on and fixed to one surface is conveyed to an inverting path 16 and inverted, and is then conveyed to the transfer position of the transfer roller 14 again.

The reading device 400 reads each surface of the sheet conveyed from the print processor 301 on the conveyance path of the sheet inside the inspection apparatus 4, generates the read image, and outputs the read image to the read image obtainer 401 configured from an information processing apparatus inside the inspection apparatus 4. Further, the sheet with the sheet surface read by the reading device 400 is further conveyed inside the inspection apparatus 4, and is discharged to a sheet ejection tray 410. FIG. 5 illustrates an example in which the reading device 400 is provided on one of surface sides of the sheet, on the conveyance path of the sheet in the inspection apparatus 4. However, the reading devices 400 may be respectively arranged on both surface sides of the sheet to enable inspection of both surfaces of the sheet.

Figure 6:
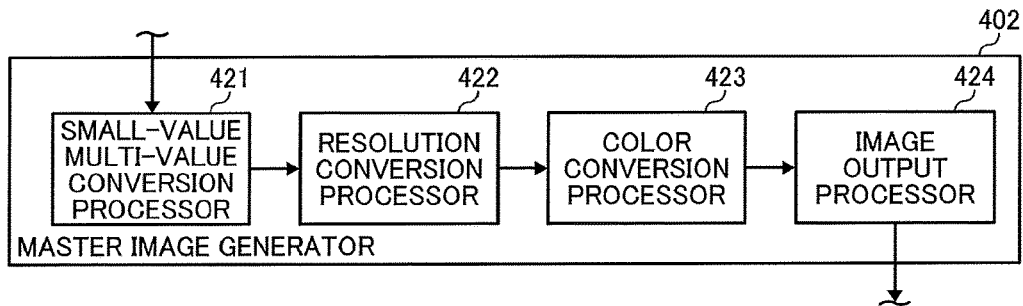
FIG. 6 is a block diagram illustrating an example of a functional configuration of a master image generator according to the first embodiment.

Next, a functional configuration of the master image generator 402 according to the first embodiment will be described. FIG. 6 is a block diagram illustrating an example of a functional configuration of the master image generator 402. As illustrated in FIG. 6, the master image generator 402 includes a small-value multi-value conversion processor 421, a resolution conversion processor 422, a color conversion processor 423, and an image output processor 424. The master image generator 402 according to the first embodiment is realized when the dedicated device 80, that is, the hardware configured from the ASIC described in FIG. 2 is operated according to control of the software.

The small-value multi-value conversion processor 421 executes small-value/multi-value conversion processing for the binary image expressed in colored/colorless manner to generate the multi-value image. The bitmap data according to the first embodiment is information for being input to the print engine 3, and the print engine 3 performs the image formation output based on the binary image in cyan, magenta, yellow, key plate (CMYK) colors. In contrast, the read image as an inspection target image is a multi-value image with multiple gradations in red, green, and blue (RGB) colors as the three primary colors. Therefore, the binary image is first converted into the multi-value image by the small-value multi-value conversion processor 421. As the multi-value image, an image expressed with 8-bit CMYK can be used, for example.

The small-value multi-value conversion processor 421 performs 8-bit expansion processing and smoothing processing as the small-value/multi-value conversion processing. The 8-bit expansion processing is processing to convert 1-bit data of 0/1 into 8-bit data, maintain "0" as "0", and convert "1" into "255". The smoothing processing is processing to apply a smoothing filter to the 8-bit data to smooth the image.

In the first embodiment, the case in which the print engine 3 executes the image formation output on the basis of the binary image in CMYK colors and the case in which the master image generator 402 includes the small-value multi-value conversion processor 421 have been described but these cases are examples. That is, the small-value multi-value conversion processor 421 can be omitted in a case where the print engine 3 executes the image formation output based on the multi-value image.

Further, there may be a case in which the print engine 3 has a function to perform the image formation output based on a small-value image such as a 2-bit image rather than a 1-bit image. This case can be handled by changing the function of the 8-bit expansion processing. That is, in a case of the 2-bit image, gradation values are four values of 0, 1, 2, and 3. Therefore, in the 8-bit expansion, "0" is converted into "0", "1" is converted into "85", "2" is converted into "170", and "3" is converted into "255".

The resolution conversion processor 422 performs resolution conversion such that the resolution of the multi-value image generated by the small-value multi-value conversion processor 421 is matched with the resolution of the read image that is the inspection target image. In the first embodiment, the reading device 400 generates the read image of 200 dpi, and thus the resolution conversion processor 422 converts the resolution of the multi-value image generated by the small-value multi-value conversion processor 421 into 200 dpi. Further, the resolution conversion processor 422 according to the first embodiment adjusts the size of the image after the resolution conversion based on a magnification determined in advance in consideration of contraction of the sheet output by the print processor 301.

The color conversion processor 423 acquires the image with the resolution converted by the resolution conversion processor 422 and performs gradation conversion and conversion of a color expression format. Gradation conversion processing is color tone conversion processing for matching the color tone of the master image with the color tone of the image formed on the sheet surface by the print processor 301 and the color tone of the image read and generated by the reading device 400.

Such processing is performed using a gradation conversion table in which gradation values of color patches in a read image, which is generated by reading a sheet with a sheet surface on which an image including color patches of various gradation colors is formed by the print processor 301, and gradation values in the original image for forming the respective color patches are associated with each other. That is, the color conversion processor 423 converts the gradation values of the colors of the image output by the resolution conversion processor 422 based on such a gradation conversion table.

Color expression format conversion processing is processing to convert an image in the CMYK format into an image in the RGB format. As described above, the read image according to the first embodiment is the image in the RGB format. Therefore, the color conversion processor 423 converts the image in the CMYK format to which the gradation conversion processing has been applied into the image in the RGB format. This color expression format conversion processing is executed using a formula for calculating values of the colors of the RGB format based on values of the colors of the CMYK format. Alternatively, the color expression format conversion processing is executed based on the conversion table in which the values of the CMYK format and the values of the RGB format are associated with each other, similarly to the above-described gradation conversion processing.

By use of the conversion table in which the values of the CMYK format and the values of the RGB format are associated with each other, and considering the above-described gradation conversion, the gradation conversion and the color expression format conversion described above can be executed at the same time. With such processing, processing load can be decreased.

The multi-value image of 200 dpi expressed with 8-bit RGB colors (total 24 bits) is generated for each pixel by the processing up to the color conversion processor 423.

The image output processor 424 outputs the master image generated by the processing up to the color conversion processor 423. Therefore, the inspection controller 403 acquires the master image from the master image generator 402.

Figure 7:
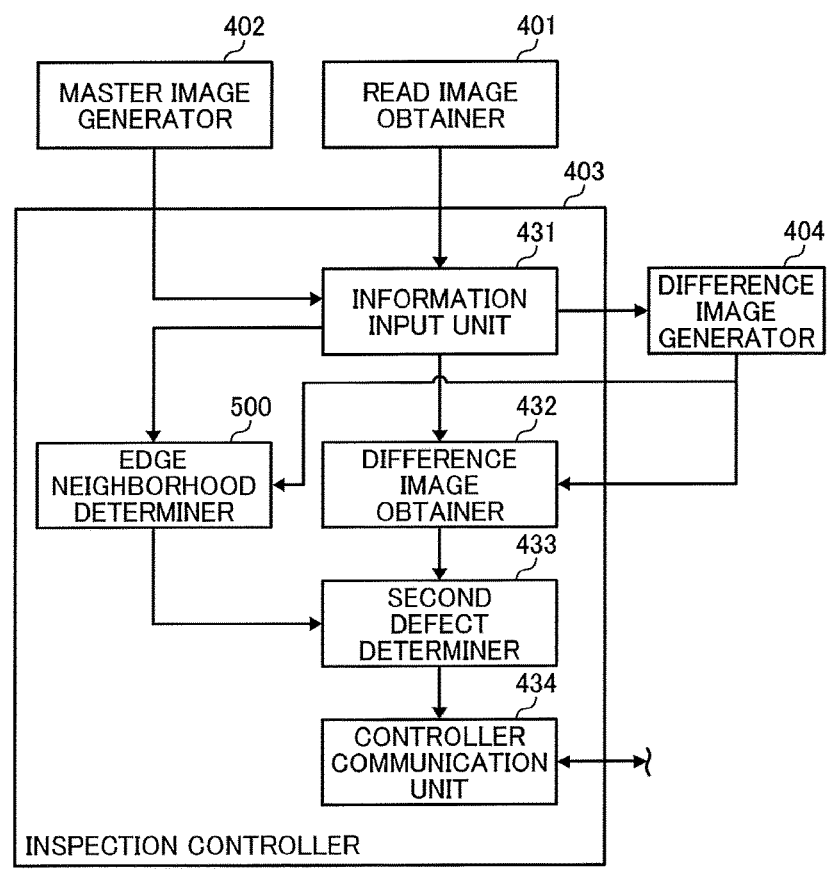
FIG. 7 is a diagram illustrating an example of a functional configuration of an inspection controller according to the first embodiment.
Figure 8:
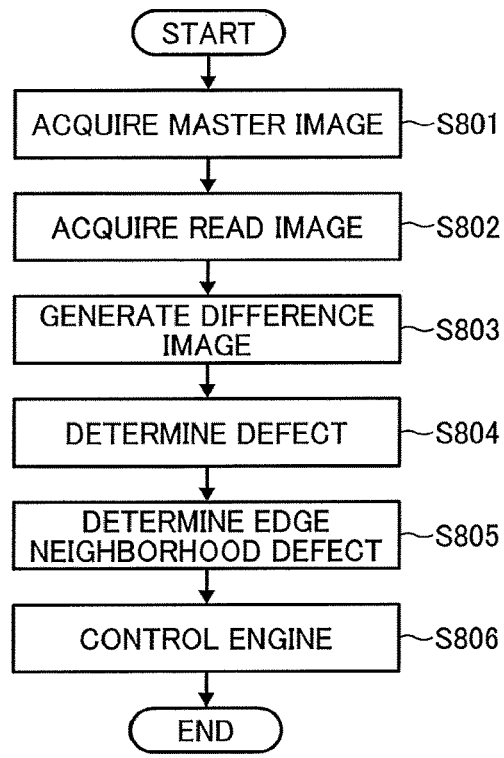
FIG. 8 is a flowchart illustrating an example of an inspection operation according to the first embodiment.

Next, a functional configuration of the inspection controller 403 according to the first embodiment will be described. FIG. 7 is a block diagram illustrating an example of a functional configuration of the inspection controller 403 according to the first embodiment. Further, FIG. 8 is a flowchart illustrating an example of an operation of image inspection of one page by the inspection controller 403 according to the first embodiment. As illustrated in FIG. 7, the inspection controller 403 according to the first embodiment includes an information input unit 431, a difference image obtainer 432, a second defect determiner 433, a controller communication unit 434, and an edge neighborhood determiner 500.

As illustrated in FIG. 8, in the inspection controller 403 according to the first embodiment, the information input unit 431 first acquires the master image from the master image generator 402 (S801), and acquires the read image from the read image obtainer 401 (S802). The processing of S801 and the processing of S802 are not restricted in order relationship, and can thus be executed in a reverse order or may be executed in parallel.

The information input unit 431 that has acquired the master image and the read image respectively extracts the images in a predetermined range from the master image and the read image and inputs the extracted images to the difference image generator 404, as described in FIG. 4. The difference image generator 404 generates the difference image that indicates the difference values between the pixels that configure the read image and the pixels that configure the master image (S803).

The difference image obtainer 432 acquires the difference image generated in the processing of S803. The second defect determiner 433 executes the defect determination based on the difference image acquired by the difference image obtainer 432 (S804).

In S804, the second defect determiner 433 compares the values of the pixels that configure the difference image and thresholds set in advance to determine whether a defect is included in the pages (printed matter). Further, the second defect determiner 433 performs labeling processing for the pixel determined to have the defect to identify a defect position or a defect type, and generates information that indicates a result of the defect determination.

The edge neighborhood determiner 500 acquires the read image and the master image from the information input unit 431 and performs edge neighborhood defect determination (S805). Edge neighborhood defect determination processing in S805 will be described in detail below. The processing of S803 and S804 and the processing of S805 may be executed in a reverse order or may be executed in parallel. When the defect determination processing and the edge neighborhood defect determination processing are completed, the controller communication unit 434 executes engine control such as a re-printing request and a stop request of the apparatus operation on the basis of a defect determination result and an edge neighborhood defect determination result (S806). With such processing, the image inspection operation according to the first embodiment is completed.

Next, the edge neighborhood defect determination operation in S805 will be described. As described above, the defect inspection by comparison between the master image and the read image is performed by the second defect determiner 433. In contrast, the edge neighborhood determiner 500 performs detailed inspection, narrowing the inspection range down to the edge neighborhood of the image.

As described above, the defect determination by the second defect determiner 433 is performed by application of the threshold to the difference image. In contrast, the read image has a tendency that the edge is more likely to be blurred due to an influence of physical characteristics of when the read image is printed or read. Therefore, the difference value between the pixel value of the read image and the pixel value of the master image is more likely to become large in the neighboring region of the edge.

In this disclosure, while the term neighboring is used, the neighboring region could be any region having one or more pixels that are close to, near, or around, or adjoining any one of one or more pixels that are detected as the edge. For this reasons, the similar terms such as "vicinity" or "close" may be used interchangeably.

Further, the edge and the edge region may be used interchangeably, as the edge and the edge region may both include one or more pixels that are extracted as the edge.

Figure 9:
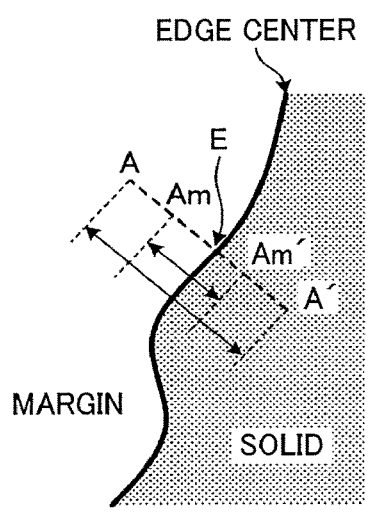
FIG. 9 is a schematic diagram illustrating an example of neighborhood of an edge according to the first embodiment.
Figure 10:
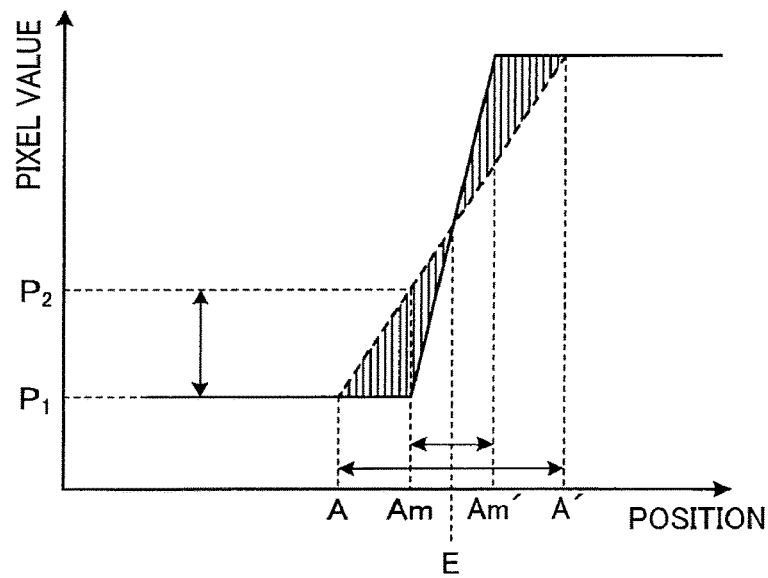
FIG. 10 is a diagram illustrating an example of a pixel value of a pixel on a read image and a pixel value of a pixel on the master image that configure a section A-A' in a direction perpendicular to an edge of FIG. 9, using a pixel E on the edge as a base point.

Here, a reason why the difference value between the pixel value of the read image and the pixel value of the master image is more likely to become large in the neighboring region of the edge will be specifically described. FIG. 9 illustrates an example of a schematic diagram of a boundary neighborhood between the margin area and the solid area (that is, the edge neighborhood), and FIG. 10 illustrates an example of a pixel value of a pixel on the read image and a pixel value of a pixel on the master image in a direction perpendicular to the edge, where a position E on the edge of FIG. 9 is a base point. In FIG. 10, the horizontal axis represents a pixel location, the vertical axis represents a pixel value, the solid line represents pixel value change on the master image, and the dotted line represents pixel value change on the read image.

Since the master image is generated from the bitmap data, the pixel value change in the direction perpendicular to the edge is sharp. However, the read image has gentle pixel value change in the direction perpendicular to the edge because the edge is blurred due to an influence of physical characteristics of when the read image is printed or read. Therefore, as illustrated in FIG. 10, an edge gradient section is the section A-A' around the position E in the read image, and is the section Am-Am' around the position E in the master image. The read image has the edge gradient in a longer section than the master image.

As a result, the pixel value of the master image at the position Am is P1 and the pixel value of the read image is P2, for example, and the difference between the pixel value of the master image and the pixel value of the read image in the position Am becomes P2−P1. Note that this difference is not caused due to the defect and is an error caused due to a difference in a generation technique between the master image and the read image, and thus needs to be permitted in the inspection.

Therefore, in inspecting the neighboring region of the edge by the comparison between the master image and the read image, a non-defect place may be erroneously determined to be the defect if a permissible range of the difference in density is not wide enough. However, if the permissible range of the difference in density is wide, a defective place may be erroneously detected not to be the defect.

Further, as described in FIG. 4, when the comparison inspection is performed in each fixed range, the processing is performed at a time for the range where the comparison inspection is to be performed, and thus a single threshold is applied. However, the range in which the comparison inspection is to be performed may include the solid area together with the edge region.

The solid area has a smaller influence of physical characteristics of when the read image is printed or read than the edge region in the read image, and the defect can be easily recognized by visual observation of a human, and thus it is favorable to set the threshold to be a small value and strictly extract small defects. Therefore, when the edge region and the solid area are included in the range where the comparison inspection is to be performed, setting of a favorable threshold is difficult. The edge neighborhood determiner 500 according to the first embodiment performs processing for favorably detecting the defect in the solid area in the edge neighborhood, corresponding to such a problem.

Figure 11:
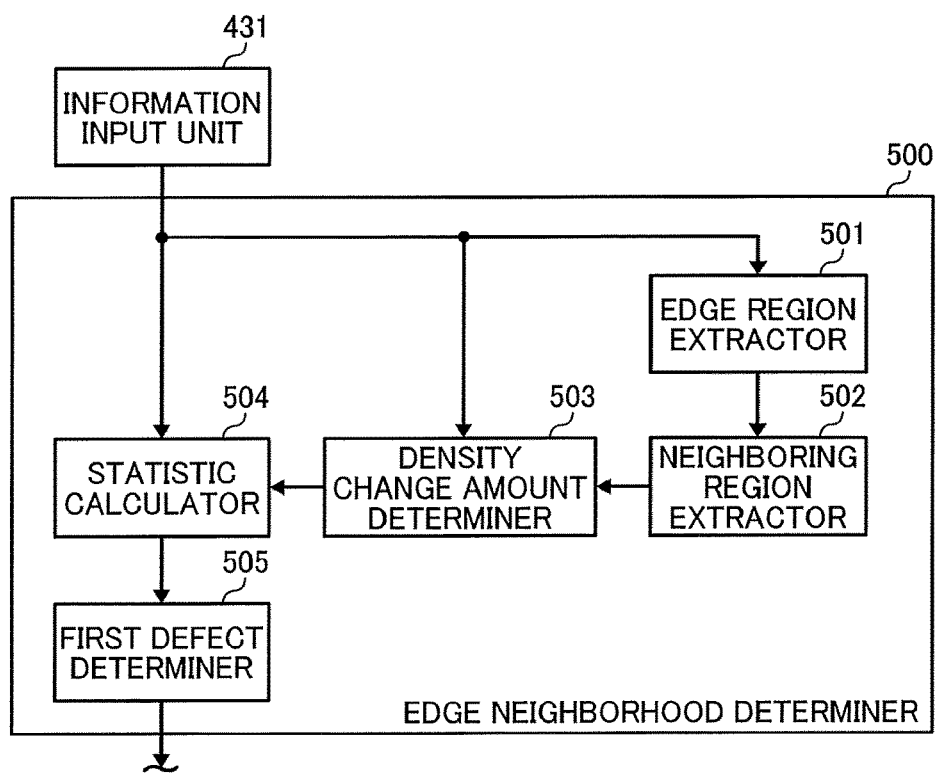
FIG. 11 is a block diagram illustrating an example of a functional configuration of an edge neighborhood determiner according to the first embodiment.

FIG. 11 is a block diagram illustrating an example of a detailed functional configuration of the edge neighborhood determiner 500 according to the first embodiment. The read image and the master image are input from the information input unit 431 to the edge neighborhood determiner 500. The input master image is input to an edge region extractor 501 and a density change amount determiner 503. Further, the read image is input to a statistic calculator 504. The position shift amount between the master image and the read image acquired by the difference image obtainer 432 is also input to the statistic calculator 504.

The edge region extractor 501 extracts the edge region from the master image. To be specific, the edge region extractor 501 applies a filter to the input master image to extracts the edge region that is a region where the density of the image is sharply changed. The edge region extractor 501 according to the first embodiment performs the edge extraction, using a Laplacian filter. However, another edge extraction method can be used.

A neighboring region extractor 502 extracts the neighboring region of the edge region extracted by the edge region extractor 501. To be specific, the neighboring region extractor 502 extracts a region within a fixed range from the pixels corresponding to the edge region extracted by the edge region extractor 501. The neighboring region extractor 502 according to the first embodiment refers to pixels in a predetermined range in a direction perpendicular to an edge region around each edge pixel and determines the pixels as the neighboring region. Details will be described below.

The density change amount determiner 503 determines whether the change amount of the density of the pixels that configure the neighboring region falls within a predetermined range. To be specific, the density change amount determiner 503 labels regions of continuing pixels, about the neighboring region extracted by the neighboring region extractor 502, and analyzes the regions corresponding to the respective labels. From this, the density change amount determiner 503 determines whether the regions corresponding to the respective labels are the margin areas whether no developer such as a toner or an ink is provided or the solid areas where the density change is in the predetermined range and the density is uniform. Both the margin area and the solid area are uniform regions where the density change amount of the included pixels falls within the predetermined range and the density is uniform.

The statistic calculator 504 calculates a statistic of the density of the pixels that configure a corresponding region that is a region of the read image, the region corresponding to the neighboring region of the master image. To be specific, when the change amount of the density of the pixels that configure the neighboring region falls within the predetermined range, the statistic calculator 504 calculates the statistic. In details, when the neighboring region is determined to be the margin area or the solid area by the density change amount determiner 503, the statistic calculator 504 refers to the region in the read image, the region corresponding to the neighboring region, and calculates a variance value of the density of the pixels, as the statistic of the density of the pixels included in the region. This variance value is used to analyze a variance form of the density of the pixels included in the region.

A first defect determiner 505 determines existence or non-existence of the defect in the corresponding region on the basis of the statistic calculated by the statistic calculator 504. To be specific, the first defect determiner 505 applies a threshold to the variance value calculated by the statistic calculator 504. From this, occurrence of the defect can be determined when the density varies although the region is determined to be the margin area or the solid area by the density change amount determiner 503. The value of the threshold may be varied according to whether the corresponding region is the margin area or the solid area. When the corresponding region is the solid area, typically, noise and nonuniformity are added, and thus variation of the pixel value is larger and the variance value is also larger than the margin area. Therefore, the threshold of when the corresponding region is the solid area may be made larger than the threshold of when the corresponding region is the margin area. Note that the value of the threshold is set in advance according to experiment data, an experimental rule, or the like.

Figure 12:
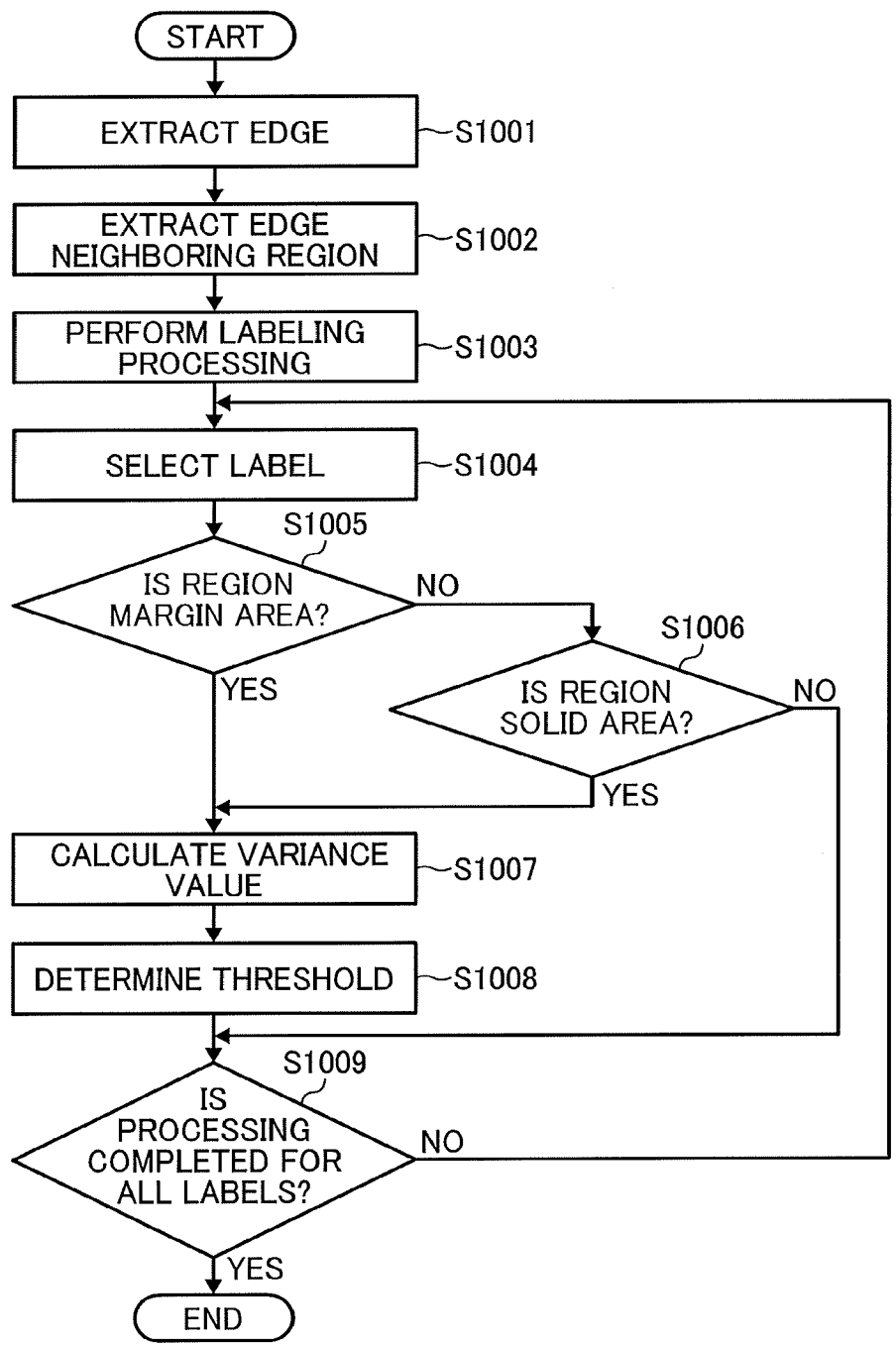
FIG. 12 is a flowchart illustrating an example of an edge neighborhood defect determination operation according to the first embodiment.
Figure 13:
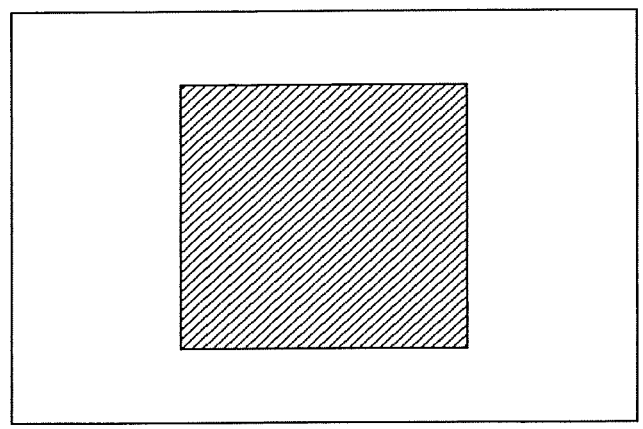
FIG. 13 is a diagram illustrating an example of the master image according to the first embodiment.
Figure 14:
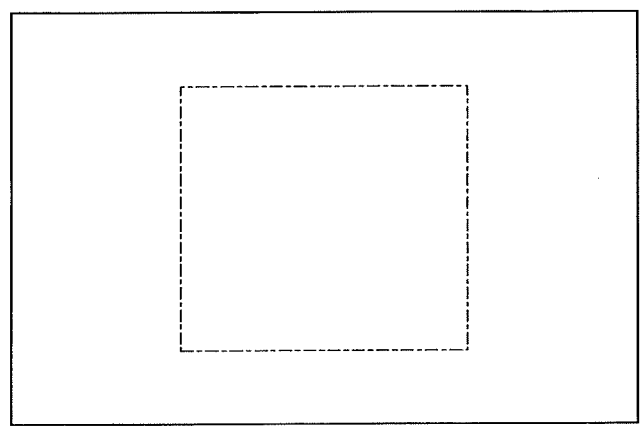
FIG. 14 is a diagram illustrating an example of an edge extraction result according to the first embodiment.

Next, an operation of the edge neighborhood determiner 500 according to the first embodiment will be described referring to the flowchart of FIG. 12. As illustrated in FIG. 12, first, the edge region extractor 501 performs the edge extraction based on the input master image (S1001). FIG. 13 is an example of the master image according to the first embodiment, and FIG. 14 is a diagram illustrating an example of an extraction result when the edge extraction processing is performed based on the master image. When the edge region extractor 501 performs filtering processing of the master image, using the Laplacian filter, as described above, the edge illustrated in FIG. 14 is extracted from the master image illustrated in FIG. 13.

Then, the neighboring region extractor 502 performs the determination processing of the neighboring region of the edge on the basis of the extraction result of the edge by the edge region extractor 501 (S1002). As described above, the neighboring region extractor 502 according to the first embodiment extracts a predetermined number of pixels adjacent in a predetermined direction, using respective edge pixels as the base points, and employs the region configured by the extracted pixels, as the neighboring region.

Figure 15:
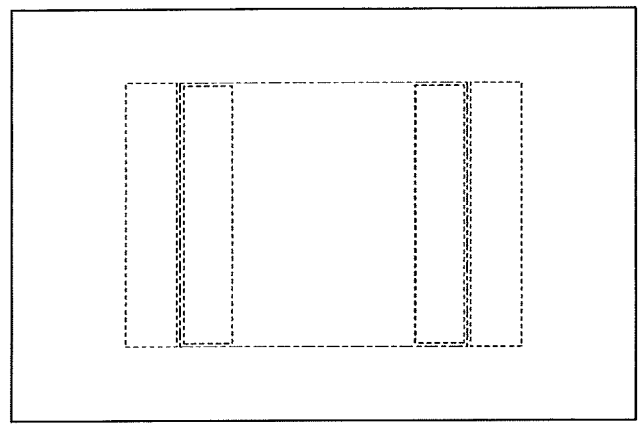
FIG. 15 is a diagram illustrating an example of a determination form of edge neighboring regions according to the first embodiment.
Figure 16:
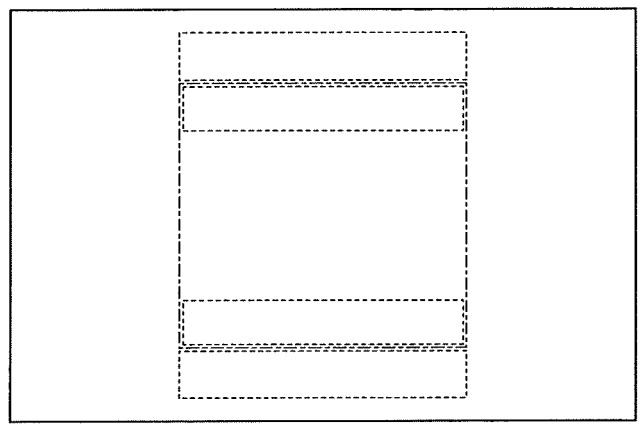
FIG. 16 is a diagram is a diagram illustrating an example of a determination form of edge neighboring regions according to the first embodiment.
Figure 17:
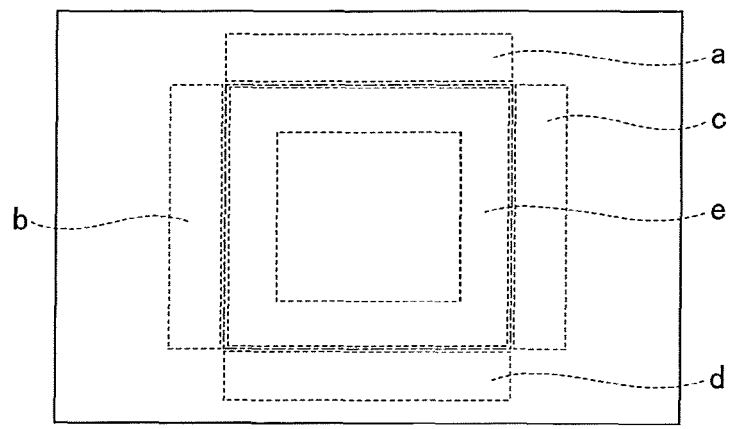
FIG. 17 is a diagram illustrating an example of a determination result of the edge neighboring regions according to the first embodiment.

FIG. 15 is a diagram illustrating a determination result of the neighboring regions when the pixels are referred in an x direction. Further, FIG. 16 is a diagram illustrating a determination result of the neighboring regions when the pixels are referred in a y direction. The determination results illustrated in FIGS. 15 and 16 are integrated, and a determination result of the neighboring regions illustrated in FIG. 17 is obtained. In this disclosure, the x direction may be a main-scanning direction, and the y direction may be a sub-scanning direction.

When the neighboring regions are identified in this way, the density change amount determiner 503 refers to the identification result, and labels respective continuing pixel regions, of the pixels identified as the neighboring regions of the edge (S1003). In the example of FIG. 17, neighboring regions a to d are respectively labeled outside the frame of the figure included in the master image, and a neighboring region e is labeled inside the frame of the figure.

When the density change amount determiner 503 generates the plurality of labels by the processing of S1003, the density change amount determiner 503 selects the label one at a time (S1004), and determines whether the pixel region of the selected label is the margin area (S1005). In S1005, the density change amount determiner 503 determines that the region is the margin area when the pixel values of a predetermined ratio or more pixels, of all the pixels included in the pixel region of the selected label, are values that indicate the margin. This predetermined ratio is, for example, 95%. Further, the value that indicates the margin is held in advance by the density change amount determiner 503. As the pixel value referred here, a total value of the values of RGB colors or a luminance value can be used.

When the pixel region of the selected label is not the margin area as a result of the determination of S1005 (NO in S1005), next, the density change amount determiner 503 determines whether a target region is the solid area (S1006). In S1006, the density change amount determiner 503 determines that the region is the solid area when the pixel values of a predetermined ratio or more pixels, of all the pixels included in the pixel region of the selected label, are the same. This predetermined ratio is, for example, 95%.

Note that, in S1006, the determination condition is not limited to the case where the pixel values of the predetermined ratio or more pixels are completely the same, and the density change amount determiner 503 may determine that the region is the solid area when the pixel values fall within a range of a predetermined value. When the region is not the solid area as a result of the determination of S1006 (NO in S1006), the density change amount determiner 503 determines that the inspection is not performed for the corresponding region of the read image, the corresponding region corresponding to the pixel region of the selected label.

When the region is the margin area as a result of the determination of S1005 (YES in S1005), or when the region is the solid area as a result of the determination of S1006 (YES in S1006), the density change amount determiner 503 notifies the statistic calculator 504 of information that indicates the pixel region of the selected label. With the notification, the statistic calculator 504 refers to the corresponding region of the read image, the corresponding region corresponding to the pixel region of the selected label, from the notified information, and calculates the variance value as the statistic of the pixel value (S1007).

As described above, the position shift amount between the master image and the read image is input to the statistic calculator 504. Therefore, the statistic calculator 504 applies the position shift amount to the information notified from the density change amount determiner 503, and refers to the pixel value of the corresponding region positioned in the read image.

The variance value calculated by the statistic calculator 504 is input to the first defect determiner 505. The first defect determiner 505 compares the input variance value with a threshold determined in advance (S1008). With the comparison, whether the region determined to be the edge neighborhood and to be the margin area or the solid area is the margin area or the solid area with small variation in the pixel value as analyzed in the master image. When the variance value exceeds the threshold determined in advance, occurrence of the defect in the corresponding region is determined.

The density change amount determiner 503 repeats the processing from S1004 until the processing is completed for all the labels generated in the processing of S1003 (NO in S1009). When the processing has been completed for all the labels (YES in S1009), the density change amount determiner 503 terminates the processing. With such processing, the edge neighborhood defect determination processing according to the first embodiment is completed.

Figure 18:
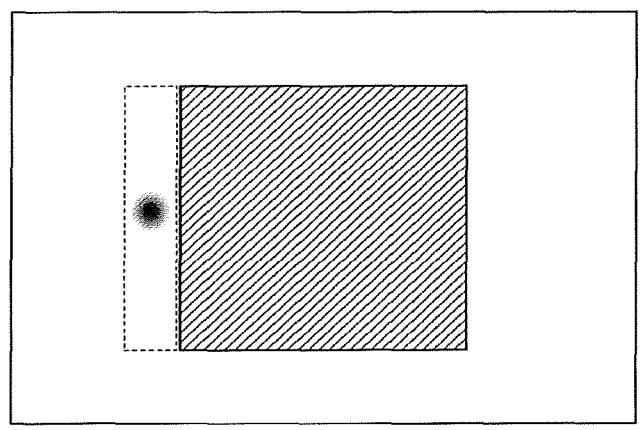
FIG. 18 is a diagram illustrating an occurrence example of a defect according to the first embodiment.

FIG. 18 is a diagram illustrating an example when the defect is caused in the image in the neighboring region b illustrated in FIG. 17. In a case of the occurrence form of the defect in the edge neighborhood, as illustrated in FIG. 18, in the defect determination in the second defect determiner 433, the second defect determiner 433 may erroneously determine that the defect is not a defect if the defect determination is performed with a wide permissible range of the difference in the density, considering blur in the edge in the read image.

Figure 19:
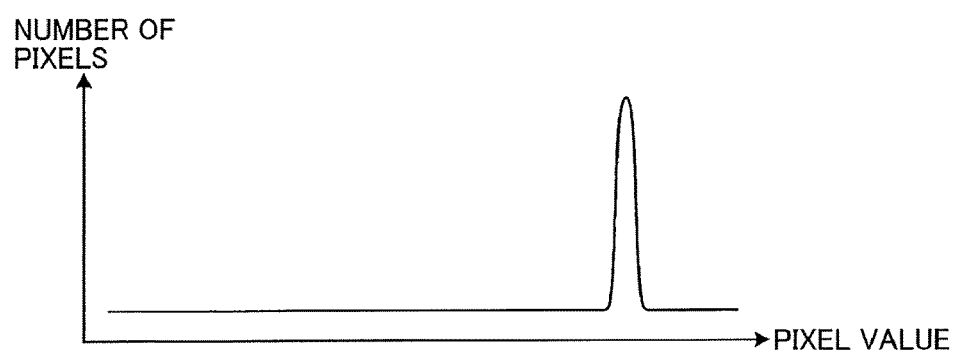
FIG. 19 is a diagram illustrating an example of an aggregate result of the number of pixels according to a pixel value according to the first embodiment.

In contrast, in the determination by the edge neighborhood determiner 500, the variance of the pixel value of the neighboring region b is analyzed and the determination is made, as illustrated in FIG. 18. Therefore, the defect can be determined without being influenced by the difference between the density of the read image and the density of the master image in the neighboring region of the edge. FIG. 19 is a diagram illustrating a graph of statistics of the pixel value of the neighboring region b when no defect occurs. As illustrated in FIG. 19, the statistics of the pixel value when no defect occurs are distributed in a narrow range around a specific pixel value.

Figure 20:
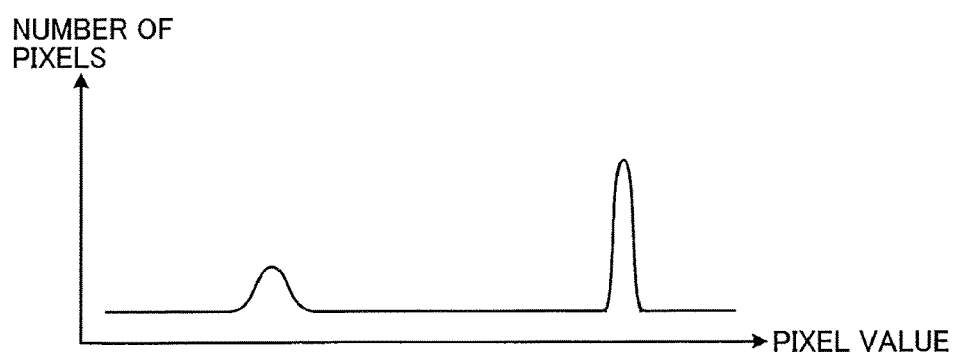
FIG. 20 is a diagram illustrating an example of an aggregate result of the number of pixels according to a pixel value according to the first embodiment.

In contrast, FIG. 20 is a diagram of a graph of statistics of the pixel value of the neighboring region b when the defect occurs, as illustrated in FIG. 18. As illustrated in FIG. 20, the statistics are distributed in a plurality of places including the pixel value of when no defect occurs and the pixel value corresponding to the defect. Such distribution of the pixel values appears as the variance values, and the defect in the margin area or the solid area in the edge neighborhood can be favorably determined.

Figure 21:
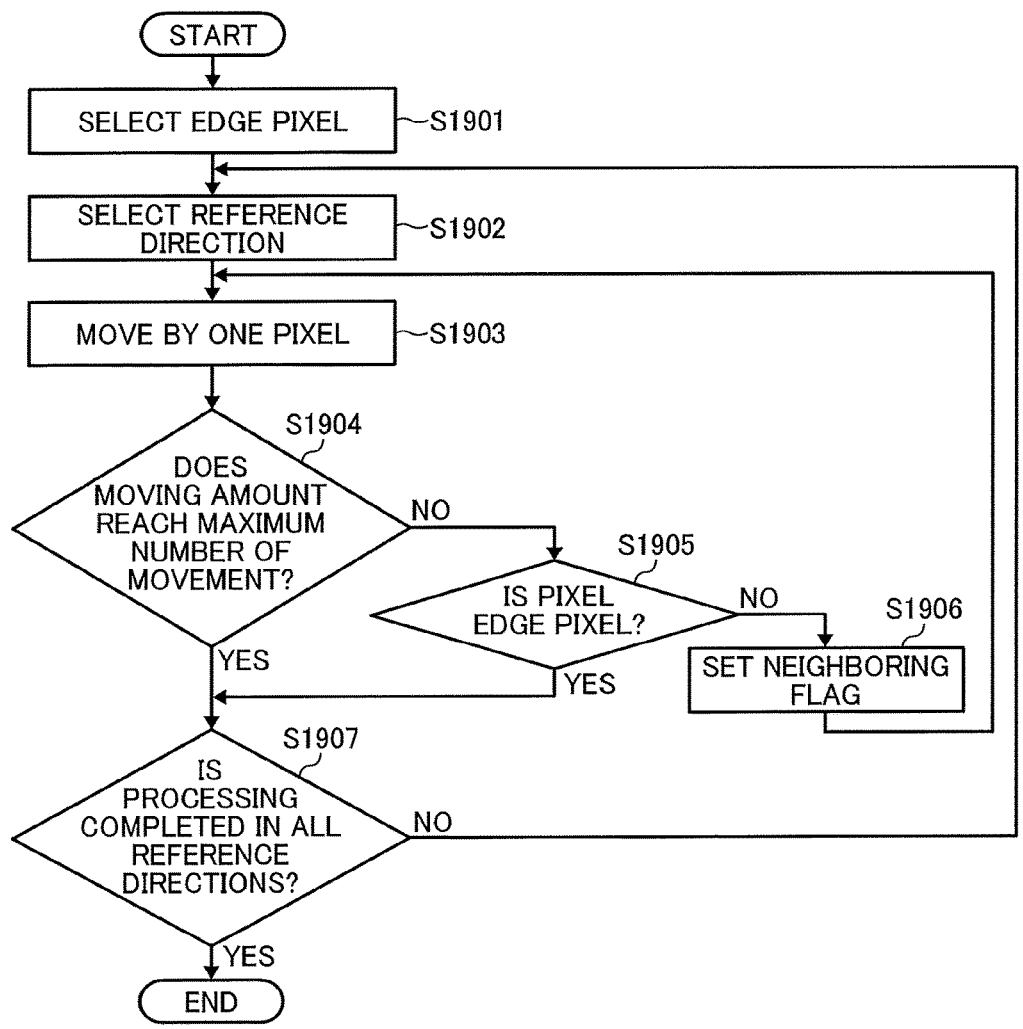
FIG. 21 is a flowchart illustrating an example of a neighboring region determination operation according to the first embodiment.

Next, an edge neighborhood determination operation by the neighboring region extractor 502 according to the first embodiment will be described referring to FIG. 21. As illustrated in FIG. 21, the neighboring region extractor 502 selects one of the edge pixels extracted as illustrated in FIG. 14 (S1901), and next, selects a direction into which the pixels are to be referred in order (S1902).

The directions into which the pixels are to be referred in order in the first embodiment are four types including an x-plus direction, an x-minus direction, a y-plus direction, and a y-minus direction. When the neighboring region extractor 502 has selected the reference direction, the neighboring region extractor 502 is moved from the reference target pixel by one pixel in the selected direction, using the edge pixel selected in S1901 as a starting point (S1903). Then, the neighboring region extractor 502 determines whether a moving amount from the edge pixel reaches the maximum number of movement as a result of the movement by one pixel (S1904).

The maximum number of movement determined in S1904 is 20 pixels, for example. That is, in the first embodiment, 20 pixels above, below, right, and left of the edge pixel are the extraction target as the edge neighborhood. When the moving amount does not reach the maximum number of movement (NO in S1904), next, the neighboring region extractor 502 determines whether the pixel in the moved destination is the edge pixel (S1905).

A flag as to whether the pixel is the edge pixel (hereinafter, referred to as "edge flag") is set to each pixel, as the determination result of the edge pixels, as illustrated in FIG. 14. Therefore, the neighboring region extractor 502 refers to the edge flag in S1905 to make determination. As a result, when the pixel is not the edge pixel (NO in S1905), the neighboring region extractor 502 sets a flag that indicates the pixel being currently referred is the extraction target as the edge neighboring region (hereinafter, referred to as "neighboring flag") (S1906), and repeats the processing from S1903.

When the moving amount has reached the maximum number of movement in S1904 (YES in S1904), or when the pixel is the edge pixel in S1905 (YES in S1905), the neighboring region extractor 502 determines that the reference direction currently being selected is terminated. Then, the neighboring region extractor 502 repeats the processing from S1902 until the processing is completed for all the reference directions (NO in S1907). When the processing has been completed for all the reference directions (YES in S1907), the neighboring region extractor 502 terminates the processing. With such processing, the processing by the neighboring region extractor 502 according to the first embodiment is completed.

When another edge pixel is included in the predetermined number of pixels adjacent in the predetermined direction from the edge pixel as the base point selected in S1901, the neighboring region extractor 502 sets the neighboring flag to the pixels between the another edge pixel and the edge pixel in the determination of S1905.

Figure 22:
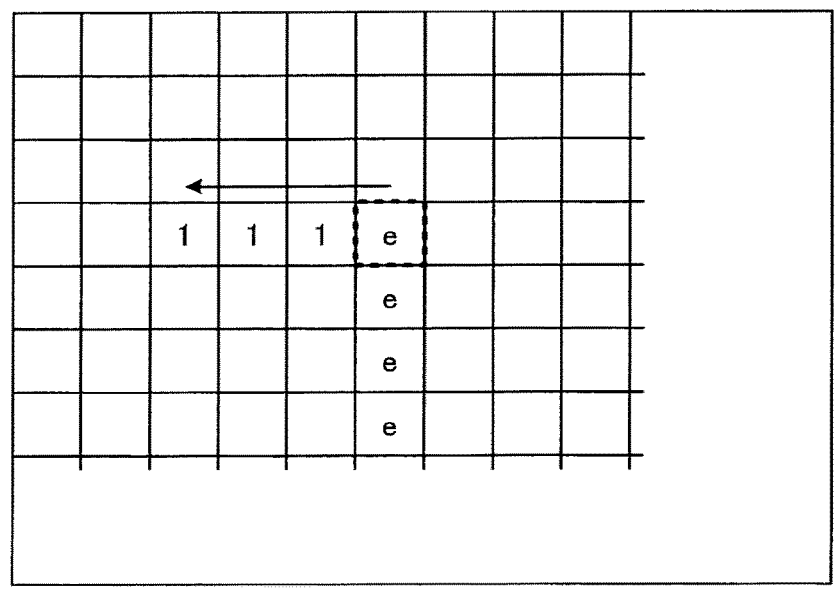
FIG. 22 is a diagram illustrating an example of a neighboring region determination form according to the first embodiment.

FIG. 22 is a diagram illustrating a setting form of the edge flag and the neighboring flag according to the first embodiment. In the first embodiment, the pixel surrounded by the thick dotted line is the edge pixel selected in S1901. Then, in S1902, the x-minus direction is selected. As a result, "1" is set to the pixels as the neighboring flag from the edge pixel currently being selected in order in the left direction, as illustrated by the arrow.

As described above, the inspection apparatus 4 according to the first embodiment calculates the statistic of the pixel value in the read image, when the neighboring region of the edge is the margin area or the solid area, to determine the defect. Therefore, the inspection apparatus 4 can highly accurately inspect the neighboring region of the edge.

In the first embodiment, the case in which the variance value is calculated about the neighboring region of the edge, and the threshold is applied to the value of the calculation result, to determine the defect has been described as an example. However, this is an example. Another form is applicable as long as the form employs the method for determining whether the region on the read image, the region corresponding to the region determined to be the margin area or the solid area, is the margin area or the solid area as determined.

For example, an aggregate result of the number of pixels with respect to the pixel value as illustrated in FIG. 19 or 20 is obtained, and when the result is distributed around the plurality of pixel values, as illustrated in FIG. 20, existence of the defect may be determined. In other words, density distribution that indicates the number of pixels in each density of the pixels is calculated, and when there are a plurality of maximum values in the density distribution, occurrence of the defect in the corresponding region may be able to be determined.

Further, in the first embodiment, the case in which the inspection apparatus 4 that compares the read image and the master image to determine whether the image is formed as intended includes the edge neighborhood determiner 500 has been described as an example. This example is an efficient configuration in terms of use of the master image and the read image, as described above, but is not essential. An image processing apparatus having the function of the edge neighborhood determiner 500 may be separately provided from the inspection apparatus 4. Even in this case, a function similar to the above example can be realized by inputs of a master image and a read image.

Further, in the first embodiment, the case in which the regions adjacent to the edge pixel around the edge pixel are extracted as the neighboring regions of the edge has been described in FIGS. 21 and 22, as an example. However, this is an example, and for example, adjacent pixels may be determined in order as the neighboring region, as illustrated in FIG. 22, with an interval of several pixels such as one pixel or two pixels from the edge pixel. With this configuration, a pixel adjacent to the edge pixel and in which change of the density value is caused although not extracted as the edge can be excluded.

Further, in the first embodiment, the case in which, when the region corresponding to the label being currently selected is determined not to be the solid area in S1006 in FIG. 12, the region is determined not to be the inspection target has been described. Here, as described in FIG. 21, the maximum range to be extracted as the neighboring region is 20 pixels in the first embodiment. In contrast, in the range of 10 pixels, for example, the region may be determined to be the margin area in S1005, or may be determined to be the solid area in S1006.

Therefore, when the target region is determined not to be the solid area in S1006, the density change amount determiner 503 may reduce the target region and repeats the processing from S1005. In this case, a form to reduce the region of 20 pixels to a region of 10 pixels, using a side of the edge pixel that is the base of the extracted region as a base point can be used. That is, the predetermined number is made small and the neighboring region is re-extracted.

Further, in the first embodiment, the case in which the regions determined as the neighboring regions in the x direction and the y direction are integrated and the subsequent processing is performed, as described in FIGS. 15 to 17, has been described as an example. Alternatively, the processing of S1003 and the subsequent processing may be separately performed in the x direction and in the y direction, respectively. In this case, the processing of S1003 and the subsequent processing are executed in the state of FIG. 15 and in the state of FIG. 16, respectively. With this processing, the defect can be separately detected in the x direction and in the y direction.

Second Embodiment

In the first embodiment, the technique to determine existence or non-existence of the defect in the corresponding region by the statistic of the corresponding region of the read image, the corresponding region corresponding to the neighboring region of the edge of the master image, has been described.

However, random noise at the time of printing or reading or nonuniformity in a fixed direction exists in the read image, and thus variation of the pixel value in the corresponding region tends to be larger as at least any of the width, the height, and the area of the corresponding region is larger. Therefore, in the technique described in the first embodiment, the statistic (variance value) becomes larger as the corresponding region is larger, and a defect may be erroneously determined although no defect exists in the corresponding region.

Therefore, in a second embodiment, a technique to solve the above problem will be described. Note that, hereinafter, different points from the first embodiment are mainly described, and a configuration element having a similar function to a configuration element of the first embodiment is denoted with similar name and sign to the first embodiment and description of the configuration element is omitted.

Figure 23:
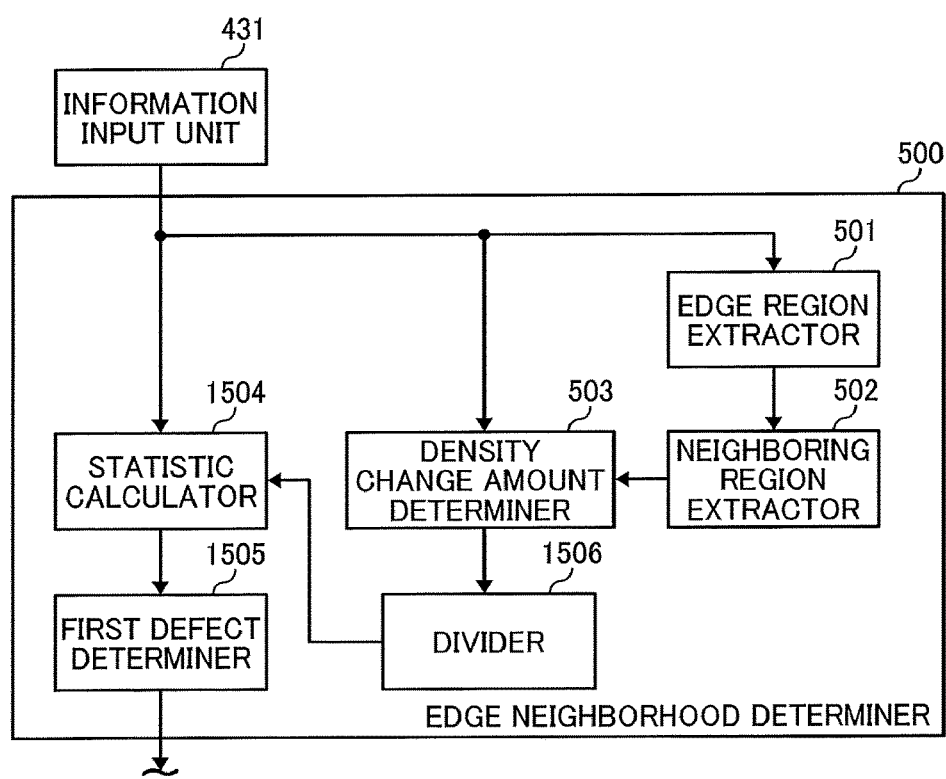
FIG. 23 is a block diagram illustrating an example of a functional configuration of an edge neighborhood determiner according to a second embodiment.

FIG. 23 is a block diagram illustrating an example of a detailed functional configuration of an edge neighborhood determiner 500 according to the second embodiment. As illustrated in FIG. 23, the edge neighborhood determiner 500 of the second embodiment is different from the first embodiment in a statistic calculator 1504, a first defect determiner 1505, and a divider 1506.

The divider 1506 determines whether a neighboring region satisfies a division requirement, when a density change amount determiner 503 determines that a change amount of density of pixels that configure the neighboring region extracted by a neighboring region extractor 502 falls within a predetermined range, and divides the neighboring region into a plurality of divided regions when the neighboring region satisfies the division requirement. The division requirement is to establish at least any of: a length in a first direction of the neighboring region satisfying a first condition; a length in a second direction of the neighboring region satisfying a second condition; and a size of an area of the neighboring region satisfying a third condition. An example of the length in the first direction of the neighboring region satisfying the first condition includes a width of the neighboring region being a threshold of the width or more. Further, an example of the length in the second direction of the neighboring region satisfying the second condition includes a height of the neighboring region being a threshold of the height or more. Further, an example of the area of the neighboring region satisfying the third condition includes the area of the neighboring region being a threshold of the area or more. Details of the division technique will be described below.

The statistic calculator 1504 calculates a statistic of the density of the pixels that configure a corresponding divided region that is a region of a read image, the region corresponding to the divided region, in each divided region divided by the divider 1506. Note that the statistic may be a variance value, similarly to the first embodiment.

The first defect determiner 1505 determines existence or non-existence of a defect in the corresponding divided region on the basis of the statistic of the corresponding divided region, in each corresponding divided region.

Figure 24:
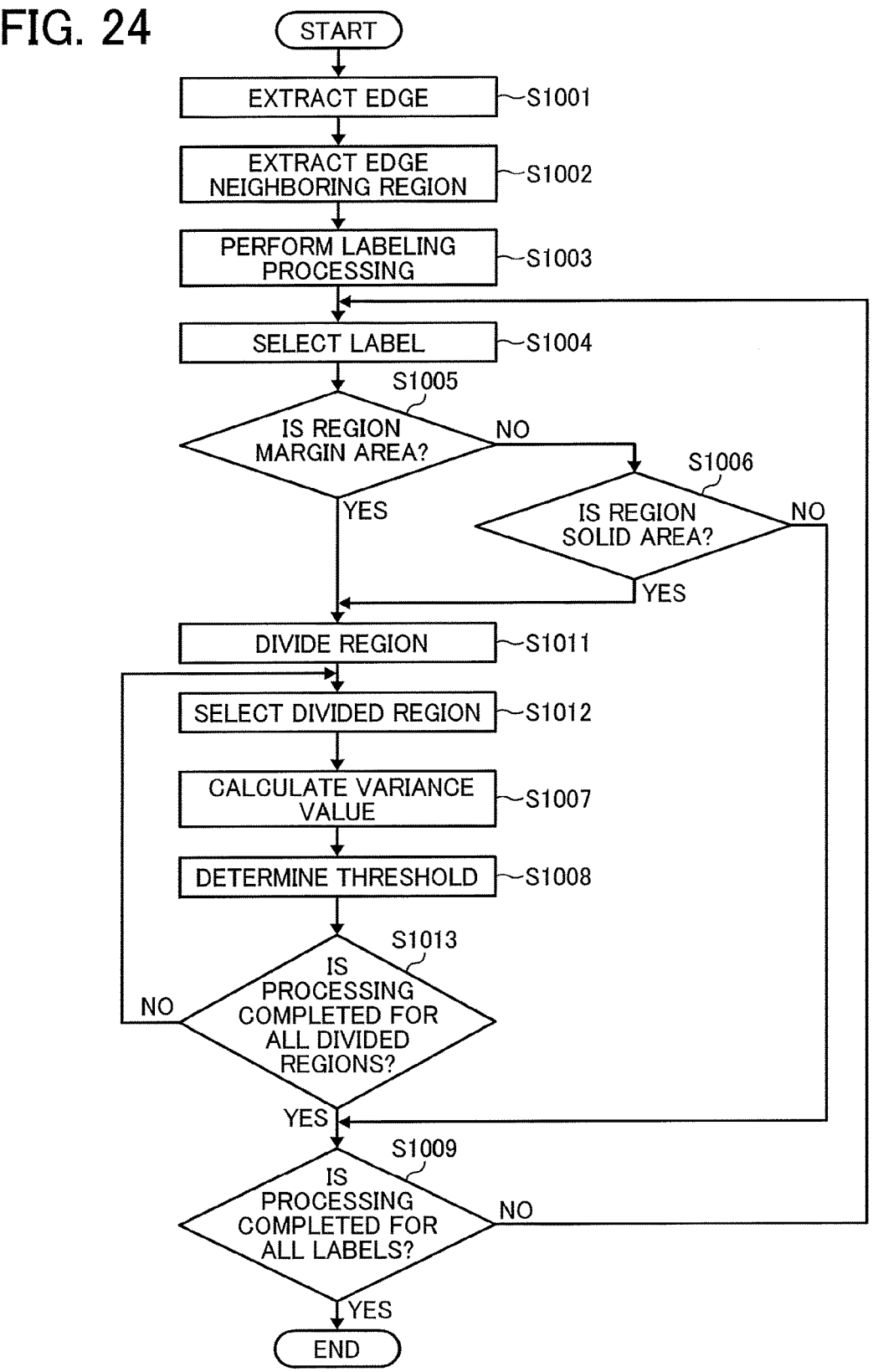
FIG. 24 is a flowchart illustrating an example of an edge neighborhood defect determination operation according to the second embodiment.

Next, an operation of the edge neighborhood determiner 500 according to the second embodiment will be described referring to the flowchart of FIG. 24. Processing from S1001 to S1006 is similar to the processing of FIG. 12.

When a region is a margin area as a result of the determination of S1005 (YES in S1005), or when the region is a solid area as a result of the determination of S1006 (YES in S1006), the divider 1506 determines whether the neighboring region that is the margin area or the solid area satisfies the division requirement. The divider 1506 divides the neighboring region into the plurality of divided regions when the neighboring region satisfies the division requirement (S1011).

When the divider 1506 has divided the neighboring region into the plurality of divided regions by the processing of S1011, the divider 1506 selects the divided region one at a time, and notifies the statistic calculator 1504 of information that indicates the selected divided region (S1012). With the notification, the statistic calculator 1504 refers to the corresponding divided region of the read image, the corresponding divided region corresponding to the selected divided region from the notified information, and calculates the variable value as the statistic of a pixel value (S1007).

The variance value calculated by the statistic calculator 1504 is input to the first defect determiner 1505. The first defect determiner 1505 compares the input variance value with a threshold determined in advance (S1008). When the variance value exceeds the threshold determined in advance, occurrence of a defect in the corresponding divided region is determined.

The divider 1506 repeats the processing from S1012 until the processing is completed for all the divided regions divided in the processing of S1011 (NO in S1013), and proceeds to S1009 when the processing has been completed for all the divided regions (YES in S1013). Processing of S1009 is similar to the processing of FIG. 12.

Figure 25:
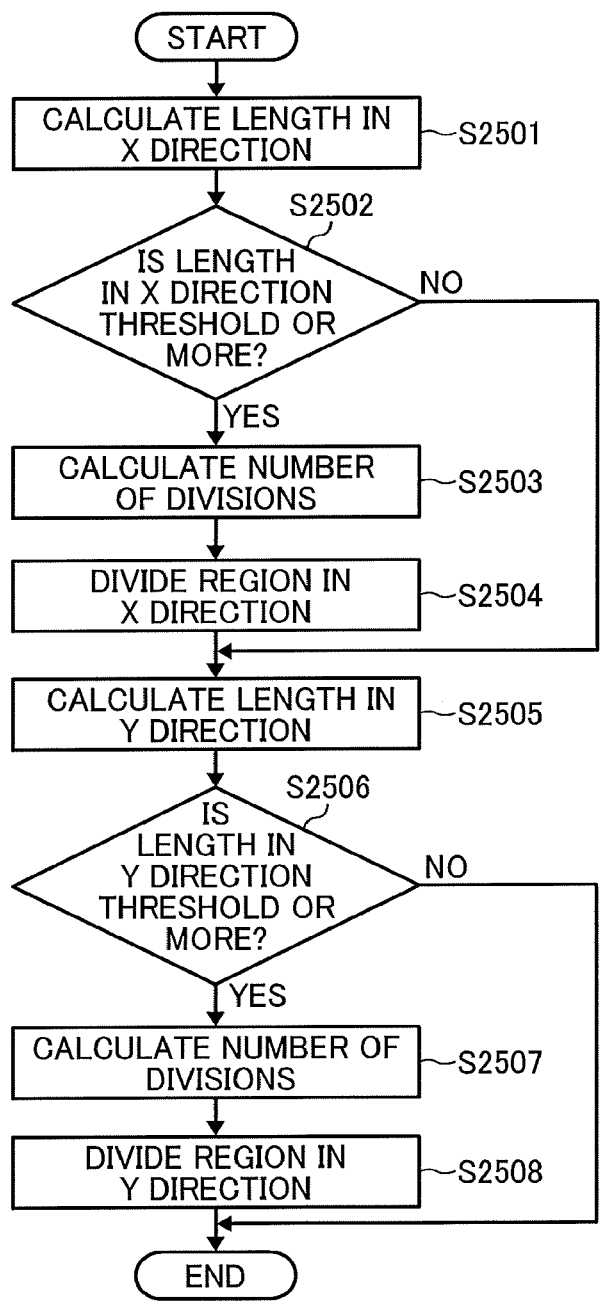
FIG. 25 is a flowchart illustrating an example of a division operation according to the second embodiment.

Next, an operation of the divider 1506 according to the second embodiment will be described referring to the flowchart of FIG. 25. In the example illustrated in FIG. 25, a case in which the division requirement is to establish at least either the length (width) in the x-axis direction of the neighboring region being a threshold of the length in the x-axis direction or more, or the length (height) in the y-axis direction of the neighboring region being a threshold of the length in the y-axis direction or more will be described. However, an embodiment is not limited to the case.

Further, in the example illustrated in FIG. 25, description will be given using neighboring regions 1031 and 1032 illustrated in FIG. 26, as examples. The neighboring region 1031 is an example of the neighboring region of an edge region 1011 illustrated in FIG. 26, and the neighboring region 1032 is an example of the neighboring region of an edge region 1012 illustrated in FIG. 26.

Figure 26:
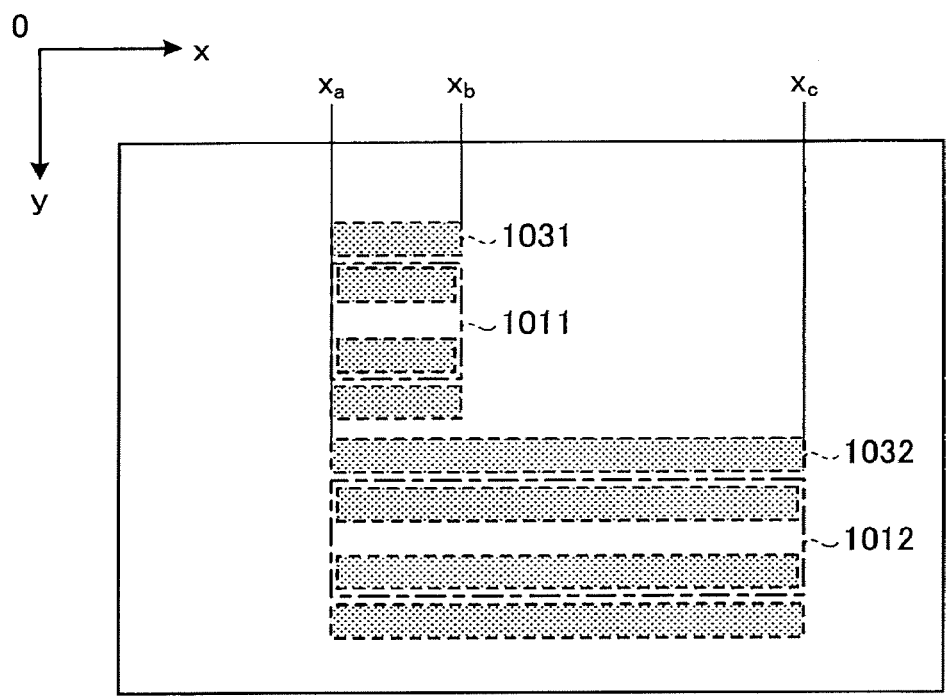
FIG. 26 is an explanatory diagram of an example of a division technique according to the second embodiment.
Figure 27:
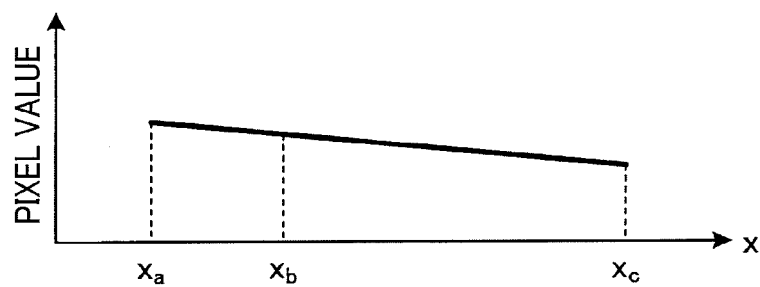
FIG. 27 is an explanatory diagram of an example of the division technique according to the second embodiment.

For example, as illustrated in FIG. 27, assume that non-uniformity in which the pixel value becomes lower toward a +x direction is caused in the read image corresponding to the master image illustrated in FIG. 26. In this case, variation in the pixel value of a section xa-xc becomes larger than a section xa-xb in the read image. Therefore, even if no defect is caused both in the corresponding region corresponding to the neighboring region 1031 and the corresponding region corresponding to the neighboring region 1032, the variance value of the corresponding region corresponding to the neighboring region 1032 becomes larger than the corresponding region corresponding to the neighboring region 1031, and may be erroneously determined to have a defect. Therefore, the neighboring region 1032 is divided into the y-axis direction. With the division, the length in the x-axis direction becomes short in the divided region, and the variation in the pixel value can be suppressed in a divided corresponding region corresponding to the divided region.

First, the divider 1506 calculates the length in the x-axis direction of the neighboring region (S2501). The length in the x-axis direction is xb-xa in the case of the neighboring region 1031, and the length in the x-axis direction is xc-xa in the case of the neighboring region 1032.

Next, the divider 1506 determines whether the length in the x-axis direction of the neighboring region is a threshold xth of the length in the x-axis direction or more (S2502). When the length is the threshold xth or more (YES in S2502), the divider 1506 calculates the number of divisions in the x-axis direction (S2503), and divides the neighboring region by the calculated number of divisions (S2504). Note that the number of divisions may be a value obtained by rounding up a value obtained by dividing the length in the x-axis direction of the neighboring region by the threshold xth so that the length in the x-axis direction of the divided region becomes the threshold xth or more. Meanwhile, when the length is less than the threshold xth (NO in S2502), the processing of S2503 and S2504 is not performed.

Here, the threshold xth satisfies xb-xa<xth<xc-xa. Therefore, in the case of the neighboring region 1031, the threshold xth satisfies xb-xa<xth, and division in the x-axis direction is not performed. Meanwhile, in the case of the neighboring region 1032, the threshold xth satisfies xth<xc-xa, and division in the x-axis direction is performed. For example, when (xc-xa)/xth is 2.8, the divider 1506 divides the neighboring region 1032 into three regions.

Next, the divider 1506 calculates the length in the y-axis direction of the neighboring region (S2505).

Next, the divider 1506 determines whether the length in the y-axis direction of the neighboring region is the threshold of the length in the y-axis direction or more (S2506). When the length is the threshold or more (YES in S2506), the divider 1506 calculates the number of divisions in the y-axis direction (S2507), and divides the neighboring region by the calculated number of divisions (S2508). Note that the number of divisions may be a value obtained by rounding up a value obtained by dividing the length in the y-axis direction of the neighboring region by the threshold so that the length in the y-axis direction of the divided region becomes the threshold or more. Meanwhile, when the length is less than the threshold (NO in S2506), the processing of S2507 and S2508 is not performed.

Note that the threshold of the length in the x-axis direction and the threshold of the length in the y-axis direction may be different values, considering that states of nonuniformity are different in the x-axis direction and in the y-axis direction in the read image. Note that the threshold of the length in the x-axis direction and the threshold of the length in the y-axis direction may be the same value.

Further, the neighboring region may be a region other than a square. Here, description is given using a neighboring region 1222 illustrated in FIG. 28 as an example. The neighboring region 1222 is an example of the neighboring region of an edge region 1212 illustrated in FIG. 28. The example illustrated in FIG. 28 will be described using a case in which the division requirement is the size of the area of the neighboring region being a threshold or more of the area. However, an embodiment is not limited to the example.

Here, assume that the area (the number of pixels) of the neighboring region 1222 is S, the threshold of the area is Sth, and Sth<S is satisfied. In this case, the divider 1506 may just divide the neighboring region 1222 such that the area of the neighboring region 1222 becomes less than the threshold Sth.

Figure 28:
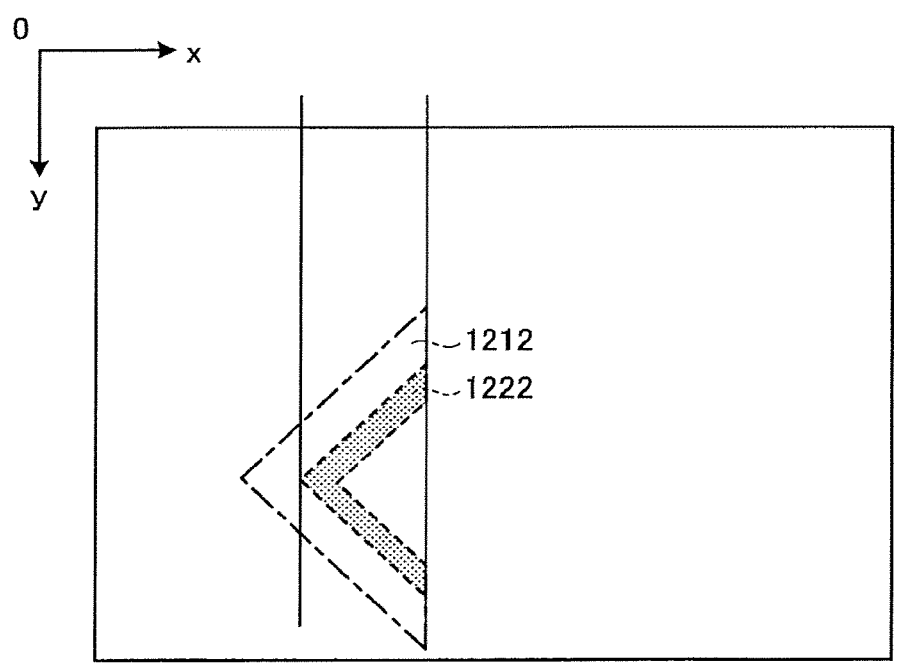
FIG. 28 is an explanatory diagram of an example of the division technique according to the second embodiment.

In the example illustrated in FIG. 28, the division requirement may be to establish at least either the length (width) in the x-axis direction of the neighboring region being a threshold of the length in the x-axis direction or more, or the size of the area of the neighboring region being a threshold of the area or more.

Here, assume that the length in the x-axis direction of the neighboring region 1222 is L, the threshold of the length in the x-axis direction is Lth, and Lth<L is satisfied. In this case, the divider 1506 divides the neighboring region 1222 such that the length in the x-axis direction of the neighboring region 1222 becomes less than the threshold Lth.

Figure 29:
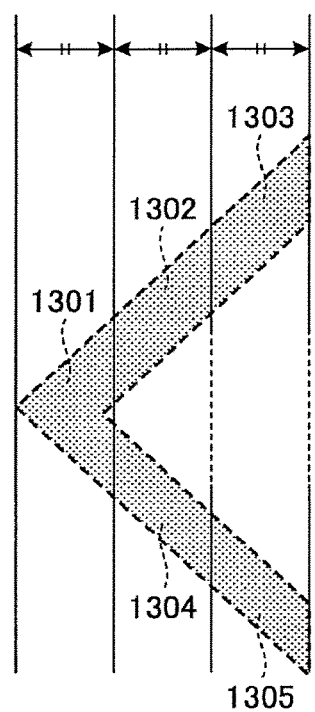
FIG. 29 is an explanatory diagram of an example of the division technique according to the second embodiment.

FIG. 29 illustrates an example in which the neighboring region 1222 is equally divided into three regions in the x-axis direction. The neighboring region 1222 is divided into divided five regions 1301 to 1305 because of the shape of the neighboring region 1222, and the sizes of the divided regions are different. Therefore, if the area of each of the divided regions 1301 to 1305 is the threshold Sth or more, the divider 1506 may just divide the divided region to have the area that is less than the threshold Sth.

Here, the example in which the division determination in the x-axis direction is made, and then the division determination in the area is performed has been described. However, the order may be reversed.

As described above, according to the second embodiment, when the neighboring region is large, the neighboring region is divided into the plurality of divided regions, and the statistic (variance value) is obtained for the plurality of divided corresponding regions respectively corresponding to the plurality of divided regions, and the defect determination is performed. Therefore, inspection accuracy of the neighboring region of the edge can be enhanced.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An inspection apparatus, comprising:
   circuitry configured to:
      acquire a master image serving as an inspection reference, the master image being generated based on image data to be printed as a printed image;
      acquire a read image read from the printed image;
      extract a neighboring region neighboring an edge region of the master image;
      determine whether a change amount of a density of pixels in the neighboring region falls within a predetermined range; and
      based on whether the change amount of the density of pixels in the neighboring region is determined to fall within the predetermined range, calculate a statistic of the density of pixels in a corresponding region of the read image, which corresponds to the neighboring region of the master image and determine existence or non-existence of a defect in the corresponding region of the read image based on the statistic of the corresponding region,
   wherein the circuitry is further configured to
      determine whether the neighboring region satisfies a division requirement when the change amount of the density of pixels in the neighboring region falls within the predetermined range,
      divide the neighboring region into a plurality of divided regions when the neighboring region satisfies the division requirement,
      calculate, for each of the plurality of divided regions, a statistic of a density of pixels in a divided region of the read image, which corresponds to the divided region of the master image, and
      determine, for each of the corresponding divided regions, existence or non-existence of the defect in the corresponding divided region based on the statistic of the corresponding divided region.

2. The inspection apparatus according to claim 1, wherein the circuitry is further configured to determine whether the neighboring region is a margin area where a developer is not supplied or a solid area where the density is uniform.

3. The inspection apparatus according to claim 1, wherein the statistic is a variance value, and
   the circuitry is further configured to determine, when the variance value exceeds a threshold, that the defect has been caused in the corresponding region.

4. The inspection apparatus according to claim 1, wherein the statistic is a density distribution that indicates a number of pixels in each density of the pixels, and
   the circuitry is further configured to determine, when a plurality of maximum values exists in the density distribution, that the defect has been caused in the corresponding region.

5. The inspection apparatus according to claim 1, wherein the circuitry is further configured to extract, for each pixel of the plurality of pixels in an edge region, a plurality of pixels adjacent to one another in one direction with respect to the pixel, to obtain a region containing the extracted pixels as the neighboring region.

6. The inspection apparatus according to claim 5, wherein when the neighboring region of one edge region includes at least one pixel that belongs to a neighboring region of another edge region different from the one edge region, the circuitry is further configured to extract the plurality of pixels adjacent to one another in the one direction, up to the pixel that belongs to the neighboring region of the other edge region.

7. The inspection apparatus according to claim 5, wherein when the change amount of the density of pixels in the neighboring region does not fall within the predetermined range, the circuitry is further configured to reduce a number of pixels to be extracted as the neighboring region, and re-extract the neighboring region.

8. The inspection apparatus according to claim 1, wherein the circuitry is further configured to generate a difference image that indicates a difference between the master image and the read image; and determine the existence or non-existence of the defect in the printed image based on the difference image.

9. The inspection apparatus according to claim 1, wherein the division requirement to be satisfied by the neighboring region includes at least one of:
   a length in a first direction of the neighboring region satisfying a first condition;
   a length in a second direction of the neighboring region satisfying a second condition; and
   a size of an area of the neighboring region satisfying a third condition.

10. A system, comprising:
   the inspection apparatus of claim 1; and
   an engine controller to control a print engine, wherein the engine controller is configured to receive a notification indicating existence of the defect, from the inspection apparatus, based on a determination that the defect exists in the corresponding region of the read image.

11. An inspection method, comprising:
   acquiring a master image serving as an inspection reference, the master image being generated based on image data to be printed as a printed image;
   acquiring a read image read from the printed image;
   extracting a neighboring region neighboring an edge region of the master image;
   first determining whether a change amount of a density of pixels in the neighboring region falls within a predetermined range; and
   based on whether the change amount of the density of pixels in the neighboring region is determined to fall within the predetermined range,
      calculating a statistic of the density of pixels in a corresponding region of the read image, which corresponds to the neighboring region of the master image; and
      second determining existence or non-existence of a defect in the corresponding region of the read image based on the statistic of the corresponding region,
   wherein the second determining step includes
      determining whether the neighboring region satisfies a division requirement when the change amount of the density of pixels in the neighboring region falls within the predetermined range;
      dividing the neighboring region into a plurality of divided regions when the neighboring region satisfies the division requirement;
      calculating, for each of the plurality of divided regions, a statistic of a density of pixels in a divided region of the read image, which corresponds to the divided region of the master image; and
      determining, for each of the corresponding divided regions, existence or non-existence of the defect in the corresponding divided region based on the statistic of the corresponding divided region.

12. The inspection method according to claim 11, wherein the first determining includes determining whether the neighboring region is a margin area where a developer is not supplied or a solid area where the density is uniform.

13. The inspection method according to claim 11, wherein the statistic is a variance value, and
   the method further comprises determining, when the variance value exceeds a threshold, that the defect has been caused in the corresponding region.

14. The inspection method according to claim 11, wherein the statistic is a density distribution that indicates a number of pixels in each density of the pixels, and
   the method further comprises determining, when a plurality of maximum values exists in the density distribution, that the defect has been caused in the corresponding region.

15. The inspection method according to claim 11, wherein the extracting includes extracting, for each pixel of the plurality of pixels in an edge region, a plurality of pixels adjacent to one another in one direction with respect to the pixel, to obtain a region containing the extracted pixels as the neighboring region.

16. The inspection method according to claim 15, when the neighboring region of one edge region includes at least one pixel that belongs to a neighboring region of another edge region different from the one edge region, the plurality of pixels adjacent to one another in the one direction, up to the pixel that belongs to the neighboring region of the other edge region, are extracted.

17. The inspection method according to claim 15, further comprising reducing, when the change amount of the density of pixels in the neighboring region does not fall within the predetermined range, a number of pixels to be extracted as the neighboring region, and re-extracting the neighboring region.

18. A non-transitory recording medium, when executed by one or more processors, cause the processors to perform an inspection method comprising:
   acquiring a master image serving as an inspection reference, the master image being generated based on image data to be printed as a printed image;
   acquiring a read image read from the printed image;
   extracting a neighboring region neighboring an edge region of the master image;
   first determining whether a change amount of a density of pixels in the neighboring region falls within a predetermined range; and
   based on whether the change amount of the density of pixels in the neighboring region is determined to fall within the predetermined range,
      calculating a statistic of the density of pixels in a corresponding region of the read image, which corresponds to the neighboring region of the master image; and
      second determining existence or non-existence of a defect in the corresponding region of the read image based on the statistic of the corresponding region,
   wherein the second determining step includes
      determining whether the neighboring region satisfies a division requirement when the change amount of the density of pixels in the neighboring region falls within the predetermined range;
      dividing the neighboring region into a plurality of divided regions when the neighboring region satisfies the division requirement:
      calculating, for each of the plurality of divided regions, a statistic of a density of pixels in a divided region of the read image, which corresponds to the divided region of the master image; and
      determining, for each of the corresponding divided regions, existence or non-existence of the defect in the corresponding divided region based on the statistic of the corresponding divided region.

\* \* \* \* \*